US010725503B2

(12) United States Patent
Choi et al.

(10) Patent No.: US 10,725,503 B2
(45) Date of Patent: Jul. 28, 2020

(54) IMAGE DISPLAY APPARATUS

(71) Applicant: LG ELECTRONICS INC., Seoul (KR)

(72) Inventors: Kwangsoo Choi, Seoul (KR); Ilho Seo, Seoul (KR); Sukhyun Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/244,443

(22) Filed: Jan. 10, 2019

(65) Prior Publication Data

US 2019/0146557 A1     May 16, 2019

Related U.S. Application Data

(63) Continuation of application No. PCT/KR2017/009334, filed on Aug. 25, 2017.

(51) Int. Cl.
*H05K 1/00* (2006.01)
*G06F 1/16* (2006.01)
*G09F 9/30* (2006.01)
*G06F 3/0484* (2013.01)

(52) U.S. Cl.
CPC ........ *G06F 1/1652* (2013.01); *G06F 3/04847* (2013.01); *G09F 9/301* (2013.01)

(58) Field of Classification Search
CPC ...... G06F 1/16; G06F 1/1652; G06F 3/04847; G09F 9/301
See application file for complete search history.

(56) References Cited

U.S. PATENT DOCUMENTS

| 8,543,166 | B2* | 9/2013 | Choi | G06F 1/1601 |
| | | | | 345/156 |
| 2014/0028596 | A1* | 1/2014 | Seo | G06F 3/0487 |
| | | | | 345/173 |
| 2015/0256803 | A1* | 9/2015 | Alhazme | H04N 9/3185 |
| | | | | 348/746 |
| 2016/0112667 | A1* | 4/2016 | Park | G06F 1/1601 |
| | | | | 348/739 |
| 2016/0306534 | A1* | 10/2016 | Woo | G06F 3/04847 |
| 2017/0212607 | A1* | 7/2017 | Yoon | G06F 3/0346 |

* cited by examiner

*Primary Examiner* — Yuriy Semenenko
(74) *Attorney, Agent, or Firm* — Birch, Stewart, Kolasch & Birch, LLP

(57) ABSTRACT

An image display apparatus including a rollable display; a drive unit configured to roll up or roll down the rollable display; and a controller configured to in response to a first display command to display a first type of content, control the drive unit to roll up the rollable display to a first size based on the first type of the content, and in response to a second display command to display a second type of content, control the drive unit to roll up the rollable display to a second size based on the second type of the content.

20 Claims, 42 Drawing Sheets

IMAGE DISPLAY APPARATUS

CROSS-REFERENCE TO RELATED APPLICATION

This application is a Continuation of PCT International Application No. PCT/KR2017/009334, filed on Aug. 25, 2017, the disclosure of which is incorporated herein by reference.

BACKGROUND OF THE INVENTION

1. Field of the Invention

The present invention relates to an image display apparatus, and more particularly, to an image display apparatus capable of changing the size of a display according to attributes of content to be displayed.

2. Description of the Related Art

An image display apparatus is an apparatus for outputting an image. The image display apparatus may output an image through a display panel or project an image to the outside using visible light or the like.

The size of the display of the image display apparatus is gradually increasing in accordance with the tendency of the image display apparatus to become larger and more sophisticated. However, display size is proportional to power consumption. In addition, when the image display apparatus is not in use, the aesthetics thereof becomes lower due to the size of the display.

SUMMARY OF THE INVENTION

Therefore, the present invention has been made in view of the above problems, and it is an object of the present invention to provide an image display apparatus capable of changing the size of a display according to the attributes of content.

In accordance with an aspect of the present invention, the above and other objects can be accomplished by the provision of an image display apparatus including a rollable display, a drive unit to change a size of the display, and a controller to control the display, wherein, when a content display command is input, the controller determines the size of the display according to an attribute of content to be displayed, and controls the drive unit to roll up or down the display according to the determined size.

In accordance with another aspect of the present invention, there is provided an image display apparatus including a rollable display, a drive unit to change a height of the display, and a controller to control the display, wherein, when a content display command is input, the controller determines the height of the display according to an attribute of content to be displayed, and controls the drive unit to roll up or down the display according to the determined height.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1A:
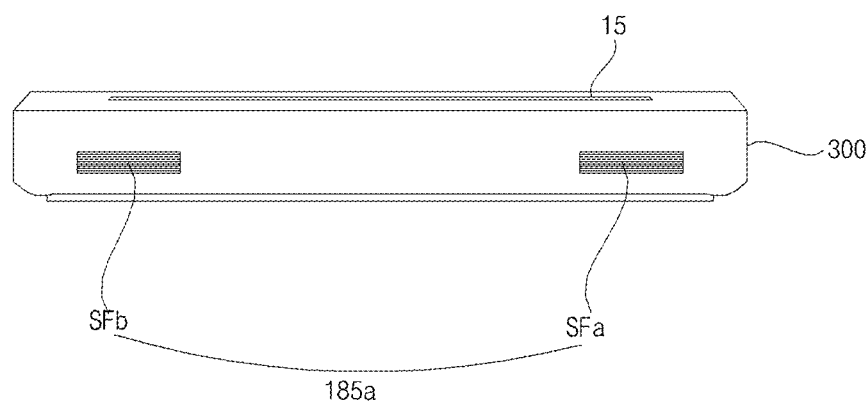
FIGS. 1A to 1D are views showing an image display apparatus having a rollable display according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

As used herein, the suffixes "module" and "unit" are added simply to facilitate preparation of this specification and are not intended to suggest special meanings or functions. Therefore, the suffixes "module" and "unit" may be used interchangeably.

FIGS. 1A to 1D are views showing an image display apparatus having a rollable display according to an embodiment of the present invention. Referring to FIGS. 1A to 1D, an image display apparatus 100 according to an embodiment of the present invention may include a display 180 and a signal processing device 300.

An opening 15 may be formed in the signal processing device 300 and the rollable display 180 may be rolled up through the opening 15 for display. To this end, the signal processing device 300 may include a drive unit (175 in FIG. 2) for driving the rollable display 180. In this case, the drive unit (175 in FIG. 2) may include a roller (not shown) on which the rollable display 180 is wound and a motor (not shown) for rotating the roller.

First, FIG. 1A illustrates that the rollable display 180 is wound in the signal processing device 300 and is not exposed to the outside of the opening 15. At this time, the signal processing device 300 is in a stand-by mode, in which only some of the units may operate, and power may not be supplied to the display 180.

Figure 1B:
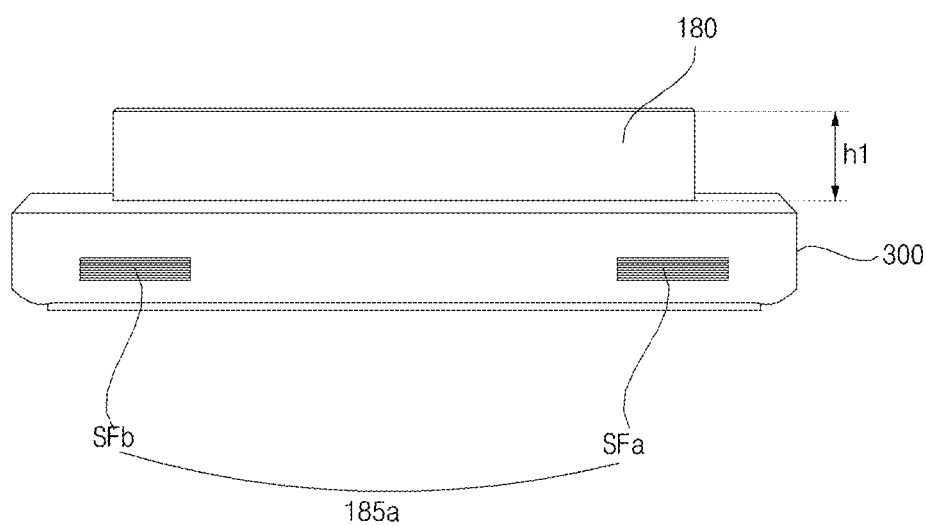
Figure 1C:
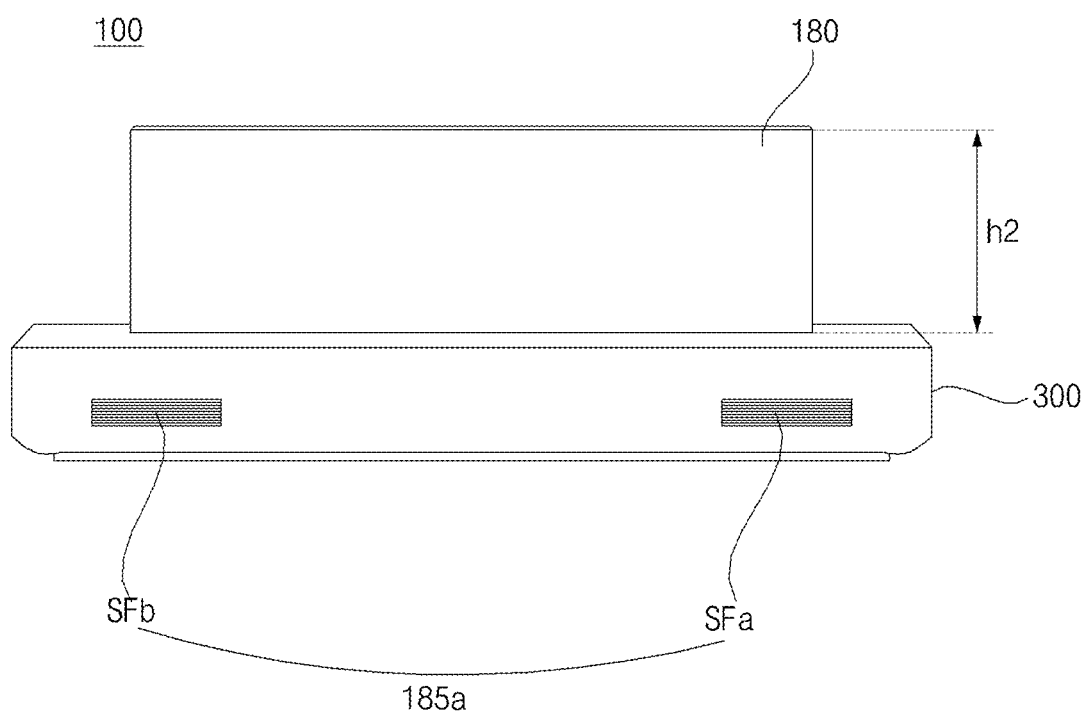
Figure 1D:
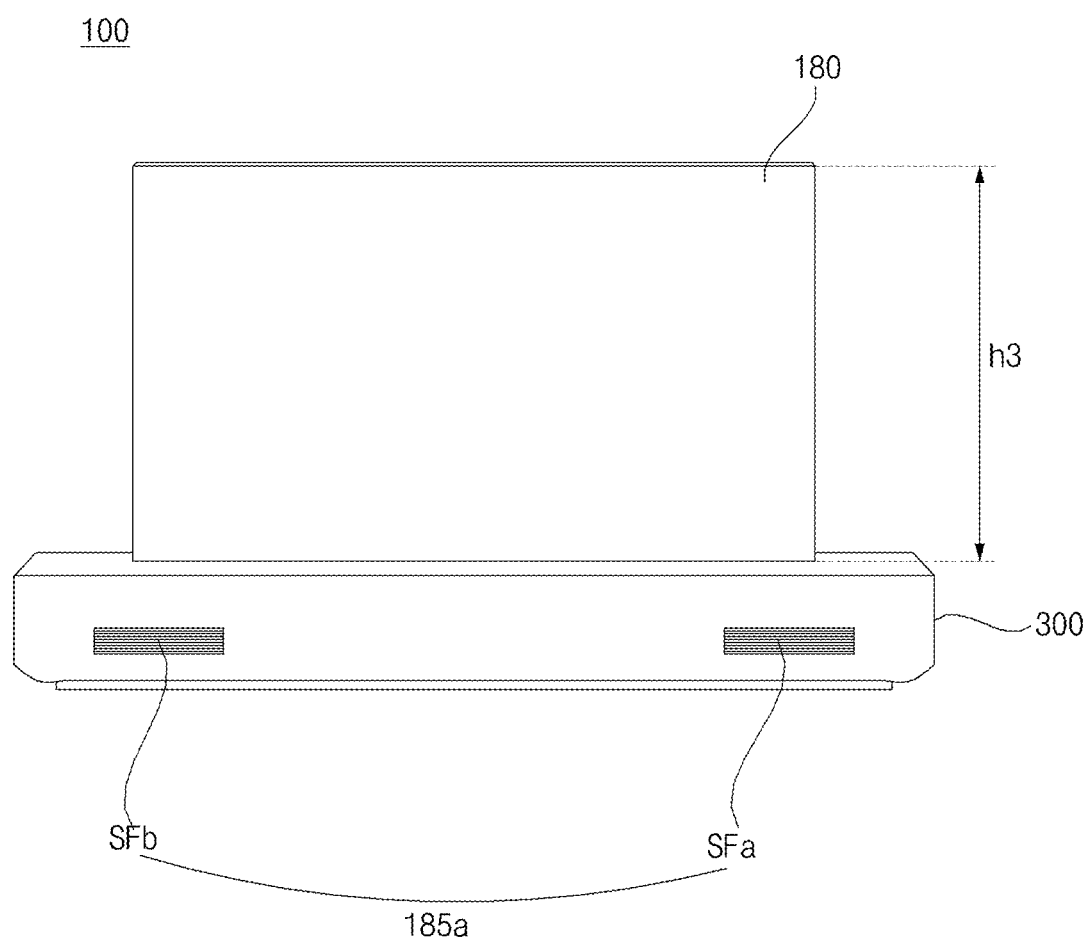

Next, FIG. 1B illustrates that the rollable display 180 is rolled up by the operation of the drive unit (175 in FIG. 2) such that the rollable display 180 has a height of h1 exposed to the outside of the opening 15. Next, FIG. 1C illustrates that the rollable display 180 is rolled up by the operation of the drive unit (175 in FIG. 2) such that the height of the rollable display 180 is h2. Next, FIG. 1D illustrates that the rollable display 180 is rolled up by the operation of the drive unit (175 in FIG. 2) such that the height of the rollable display 180 is h3.

The image display apparatus 100 according to an embodiment of the present invention includes a rollable display 180, a drive unit 175 for changing the size of the display 180, and a controller 170 for controlling the display 180. When a content display command is input, the controller 170 determines the size of the display 180 according to an attribute of the content to be displayed and controls the drive unit 175 to roll the display 180 up or down according to the determined size.

Accordingly, the size of the display 180 may be changed according to the attribute of the content. In addition, unnecessary power may be reduced by changing the size of the display 180 according to the attribute of the content. As a result, power consumption may be reduced.

According to another embodiment of the present invention, the image display apparatus 100 includes a rollable display 180, a drive unit 175 for changing the height of the display 180, and a controller 170 for controlling the display 180. When a content display command is input, the controller 180 determines the height of the display 180 according to an attribute of the content to be displayed and controls the drive unit 175 to roll the display 180 up or down according to the determined height. Accordingly, the size of the display 180 may be changed according to the attribute of the content.

Meanwhile, the rollable display 180 may be a flexible display, and include an organic light emitting diode panel (OLED panel). The OLED panel may include a plurality of scan lines and a plurality of data lines, and pixels each including a sub-pixel may be defined at the intersection between each scan line and each data line.

The pixel circuit of the OLED panel may include a switching transistor SW1, a storage capacitor Cst, a driving transistor SW2, and an organic light emitting diode (OLED) layer. The switching transistor SW1 has a gate terminal connected with a scan line and turned on according to an input scan signal Vdscan. When turned on, the switching transistor SW1 transmits an input data signal Vdata to the gate terminal of the driving transistor SW2 or one end of the storage capacitor Cst.

The storage capacitor Cst is formed between the gate terminal and the source terminal of the driving transistor SW2 and stores a predetermined difference between the level of the data signal transmitted to one end of the storage capacitor Cst and the level of DC power VDD transmitted to the other end of the storage capacitor Cst. For example, when the data signals have different levels according to the pulse amplitude modulation (PAM) scheme, the power level to be stored in the storage capacitor Cst depends on the level difference of the data signal Vdata.

As another example, when the data signals have different pulse widths according to the pulse width modulation (PWM) scheme, the power level to be stored in the storage capacitor Cst depends on the pulse width difference of the data signal Vdata. The driving transistor SW2 is turned on according to the level of power stored in the storage capacitor Cst. When the driving transistor SW2 is turned on, the driving current IOLED, which is proportional to the level of stored power, flows to the OLED layer. Accordingly, the OLED layer performs the light emitting operation.

The OLED layer may include a light emitting layer (EML) of RGBW corresponding to a subpixel. The organic light emitting layer (OLED) may include at least one of a hole injection layer (HIL), a hole transport layer (HTL), an electron transport layer (ETL), and an electron injection layer (EIL) and may also include a hole blocking layer. In the organic light emitting layer (OLED), all subpixels emit white light. In the case of green, red, and blue subpixels, however, a separate color filter is provided to implement colors. That is, when the green, red, and blue subpixels are provided, green, red, and blue color filters are further provided. For the white subpixel, since white light is output, a separate color filter is not required.

The signal processing device 300 may include a speaker unit 185a capable of outputting sound in a front direction. In the figure, it is illustrated that speakers SFa and SFb belonging to the speaker unit 185a are arranged in the front direction of the signal processing device 300. Accordingly, the sound output from the speaker unit 185a is emitted toward the user, and reaches the user.

Figure 2:
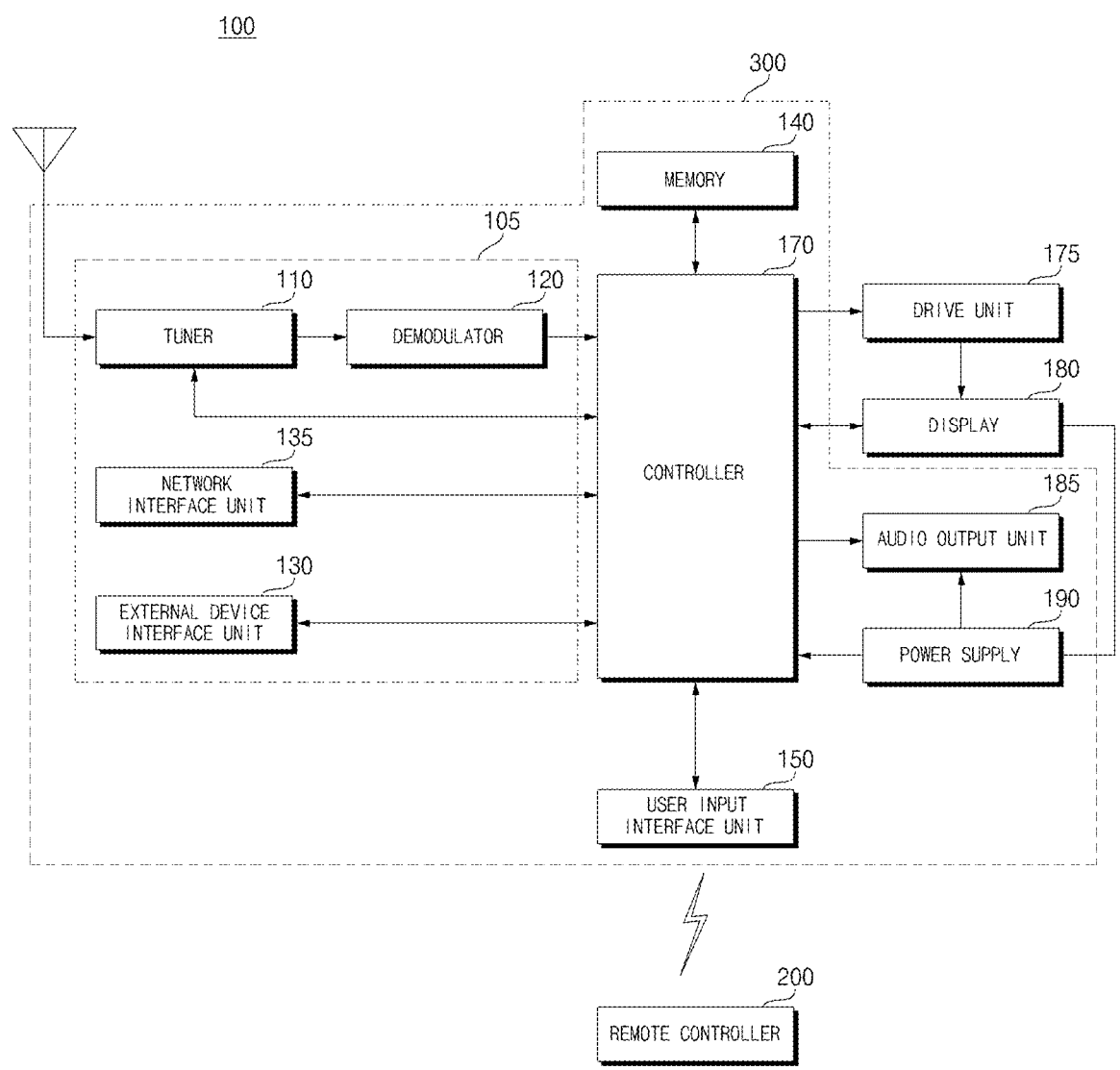
FIG. 2 is an internal block diagram of the image display apparatus of FIGS. 1A to 1D.

The image display apparatus 100 of FIGS. 1A to 1D may be a monitor, a TV, a tablet, a mobile terminal, or the like. FIG. 2 is an internal block diagram of the image display apparatus of FIGS. 1A to 1D. Referring to FIG. 2, the image display apparatus 100 according to an embodiment of the present invention may include a display 180 and a signal processing device 300.

The signal processing device 300 includes a tuner 110, a demodulator 120, an external device interface unit 130, a network interface unit 135, a memory 140, a user input interface unit 150, a sensor unit (not shown), a controller 170, an audio output unit 185, and a drive unit 175. While it is illustrated in the figure that the tuner 110, the demodulator 120, the external device interface unit 130, and the network interface unit 135 are provided in a broadcast receiver 105, various variations can be made.

The tuner 110 selects a radio frequency (RF) broadcast signal corresponding to a channel selected by the user or all pre-stored channels among RF broadcast signals received through the antenna 50. In addition, the tuner 110 converts the selected RF broadcast signal into an intermediate frequency signal, a baseband image, or a voice signal. For example, if the selected RF broadcast signal is a digital broadcast signal, the signal is converted into a digital IF signal (DIF). If the selected RF broadcast signal is an analog broadcast signal, the signal is converted into an analog baseband image or voice signal (CVBS/SIF). That is, the tuner 110 may process a digital broadcasting signal or an analog broadcasting signal. The analog baseband image or voice signal (CVBS/SIF) output from the tuner 110 may be directly input to the controller 170.

Meanwhile, in the present invention, the tuner 110 may sequentially select RF broadcast signals of all broadcast channels stored by a channel memorization function among the RF broadcast signals received through the antenna, and convert the same into intermediate frequency signals, baseband images, or voice signals. To receive broadcast signals of a plurality of channels, a plurality of tuners 110 may be provided. Alternatively, a single tuner to receive a plurality of channels simultaneously may be provided.

The demodulator 120 receives the digital IF signal DIF converted by the tuner 110 and performs a demodulation operation. After performing demodulation and channel decoding, the demodulator 120 may output a stream signal TS. Herein, the stream signal may be a signal obtained by multiplexing an image signal, voice signal or data signal.

The stream signal output from the demodulator 120 may be input to the controller 170. After performing demultiplexing and image/voice signal processing, the controller 170 outputs an image to the display 180 and a voice to the audio output unit 185. The external device interface unit 130 may transmit or receive data to or from a connected external device 190. To this end, the external device interface unit 130 may include an A/V input/output unit (not shown) or a wireless communication unit.

The external device interface unit 130 may be connected to external devices such as a DVD (digital versatile disc) player, a Blu-ray player, a gaming device, a camera, a camcorder, a computer (laptop), and a set-top box in a wired/wireless manner, and perform input/output operations with external devices. The A/V input/output unit may receive image and voice signals input from an external device. Meanwhile, the wireless communication unit may perform short-range wireless communication with other electronic devices.

The network interface unit 135 provides an interface for connection with a wired/wireless network including the Internet. For example, the network interface unit 135 may receive content or data provided by a content provider or a network operator over a network.

The memory 140 may store programs for processing and control of signals in the controller 170, and also store a signal-processed image, voice signal or data signal. The memory 140 may also function to temporarily store an image signal, a voice signal or a data signal input through the external device interface unit 130. In addition, the memory 140 may store information about a predetermined broadcast channel through the channel memorization function such as a channel map.

While it is illustrated in FIG. 2 that the memory 140 is provided separately from the controller 170, embodiments of the present invention are not limited thereto. The memory 140 may be provided in the controller 170.

The user input interface unit 150 may transmit a signal input by the user to the controller 170 or transmit a signal from the controller 170 to the user. For example, the user input interface unit 150 may transmit/receive user input signals such as power on/off, channel selection, and screen window setting to/from the remote controller 200, deliver, to the controller 170, user input signals input through local keys (not shown) such as a power key, a channel key, a volume key, or a setting key, deliver, to the controller 170, user input signals input through a sensor unit (not shown) configured to sense user gestures, or transmit a signal from the controller 170 to the sensor unit (not shown).

The control unit 170 may demultiplex the input stream or process the demultiplexed signals through the tuner 110, the demodulator 120, or the external device interface unit 130 to generate and output a signal for outputting an image or sound. An image signal image-processed by the controller 170 may be input to the display 180 and an image corresponding to the image signal may be displayed. In addition, the image signal which is image-processed by the controller 170 may be input to an external output device through the external device interface unit 130.

A voice signal processed by the controller 170 may be output to the audio output unit 185 in the form of sound. In addition, the voice signal processed by the controller 170 may be input to an external output device through the external device interface unit 130. Although not shown in FIG. 2, the controller 170 may include a demultiplexer and an image processor, which will be described with reference to FIG. 3 later.

Additionally, the controller 170 may control overall operation of the image display apparatus 100. For example, the controller 170 may control the tuner 110 to tune to RF broadcasting corresponding to a channel selected by the user or a pre-stored channel. The controller 170 may control the image display apparatus 100 according to a user command input through the user input interface unit 150 or an internal program.

The controller 170 may control the display 180 to display an image. Herein, the image displayed on the display 180 may be a still image, a moving image, a 2D image, or a 3D image. The controller 170 may perform a control operation to generate a 3D object from a predetermined 2D object in an image displayed on the display 180 and display the same. For example, the object may be at least one of an accessed web page (a newspaper, a magazine, etc.), an EPG (electronic program guide), various menus, a widget, an icon, a still image, a moving image and text.

The controller 170 may recognize the position of the user based on the image captured by an image capture unit (not shown). For example, the distance (z-axis coordinate) between the user and the image display apparatus 100 may be identified. The x-axis coordinate and the y-axis coordinate in the display 180 corresponding to the user position may also be identified.

Although not shown in the figure, a channel browsing processor for creating a thumbnail image corresponding to a channel signal or an external input signal may be further provided. The channel browsing processor may receive a stream signal TS output from the demodulator 120 or a stream signal output from the external device interface unit 130 and extract an image from the input stream signal to create a thumbnail image. The created thumbnail image may be stream-decoded together with a decoded image and input to the controller 170. The controller 170 may display a thumbnail list including a plurality of thumbnail images on the display 180 using the input thumbnail image.

The thumbnail list may be displayed in a simple view mode in which the thumbnail list is displayed on a part of the display 180 with a predetermined image displayed on the display 180, or may be displayed in a full view mode in which the thumbnail list is displayed in most of the area of the display 180. The thumbnail images in the thumbnail list may be sequentially updated.

The drive unit 175 may include a roller (not shown) on which the rollable display 180 is wound and a motor (not shown) for rotating the roller. The rollable display 180 may be rolled up or down by the drive unit 175. The display 180 generates drive signals by converting an image signal, data signal, OSD signal, and control signal processed by the controller 170 or an image signal, data signal and control signal received from the external device interface unit 130.

The display 180 includes an organic light emitting panel and is flexible or rollable. The display 180 may be configured by a touchscreen and may thus be used not only as an output device but also as an input device. The audio output unit 185 receives a voice signal processed by the controller 170 and outputs voice. The audio output unit 185 may include a speaker unit 185a as described above.

The capture unit (not shown) captures an image of the user. The capture unit (not shown) may be implemented using one camera. However, embodiments of the present invention are not limited thereto. The capture unit (not shown) may be implemented using a plurality of cameras. The capture unit (not shown) may be buried in the upper portion of the display 180 of the image display apparatus or may be separately disposed. Image information captured by the capture unit (not shown) may be input to the controller 170.

The controller 170 may sense gesture of the user based on an image captured by the capture unit (not shown), a sensed signal from the sensor unit (not shown), or a combination thereof. The power supply 190 supplies power to overall parts of the image display apparatus 100. In particular, the power supply 190 may supply power to the controller 170, which may be implemented in the form of a system on chip (SOC), the display 180 for display of images, and the audio output unit 185 for outputting audio signals.

Specifically, the power supply 190 may include a converter to convert alternating current (AC) power into direct current (DC) power and a DC-DC converter to change the level of the DC power. The remote controller 200 transmits a user input to the user input interface unit 150. To this end, the remote controller 200 may employ Bluetooth, radio frequency (RF) communication, infrared (IR) communication, ultra-wideband (UWB), or ZigBee. In addition, the remote controller 200 may receive an image signal, a voice signal or a data signal from the user input interface unit 150, and display or output the same.

The image display apparatus 100 may be a fixed or mobile digital broadcast receiver capable of receiving digital broadcast services. The block diagram of the image display apparatus 100 shown in FIG. 2 is simply illustrative. Constituents of the block diagram may be integrated, added or omitted according to the specifications of the image display apparatus 100 which is implemented in reality. That is, two or more constituents may be combined into one constituent, or one constituent may be subdivided into two or more constituents, when necessary. In addition, the function performed by each block is simply illustrative, and it should be noted that specific operations or devices of the blocks do not limit the scope of the present invention.

Unlike the example shown in FIG. 2, the video display apparatus 100 may not include the tuner 110 and the demodulator 120 shown in FIG. 2, but may receive and reproduce image content through the network interface unit 135 or an external device interface unit 130.

The image display apparatus 100 is an example of an image signal processing device that performs signal processing of an image stored in the apparatus or an input image. Other examples of the image signal processing device may include a set-top box without the display 180 and the audio output unit 185 shown in FIG. 2, a DVD player, a Blu-ray player, a gaming device, and a computer.

Figure 3:
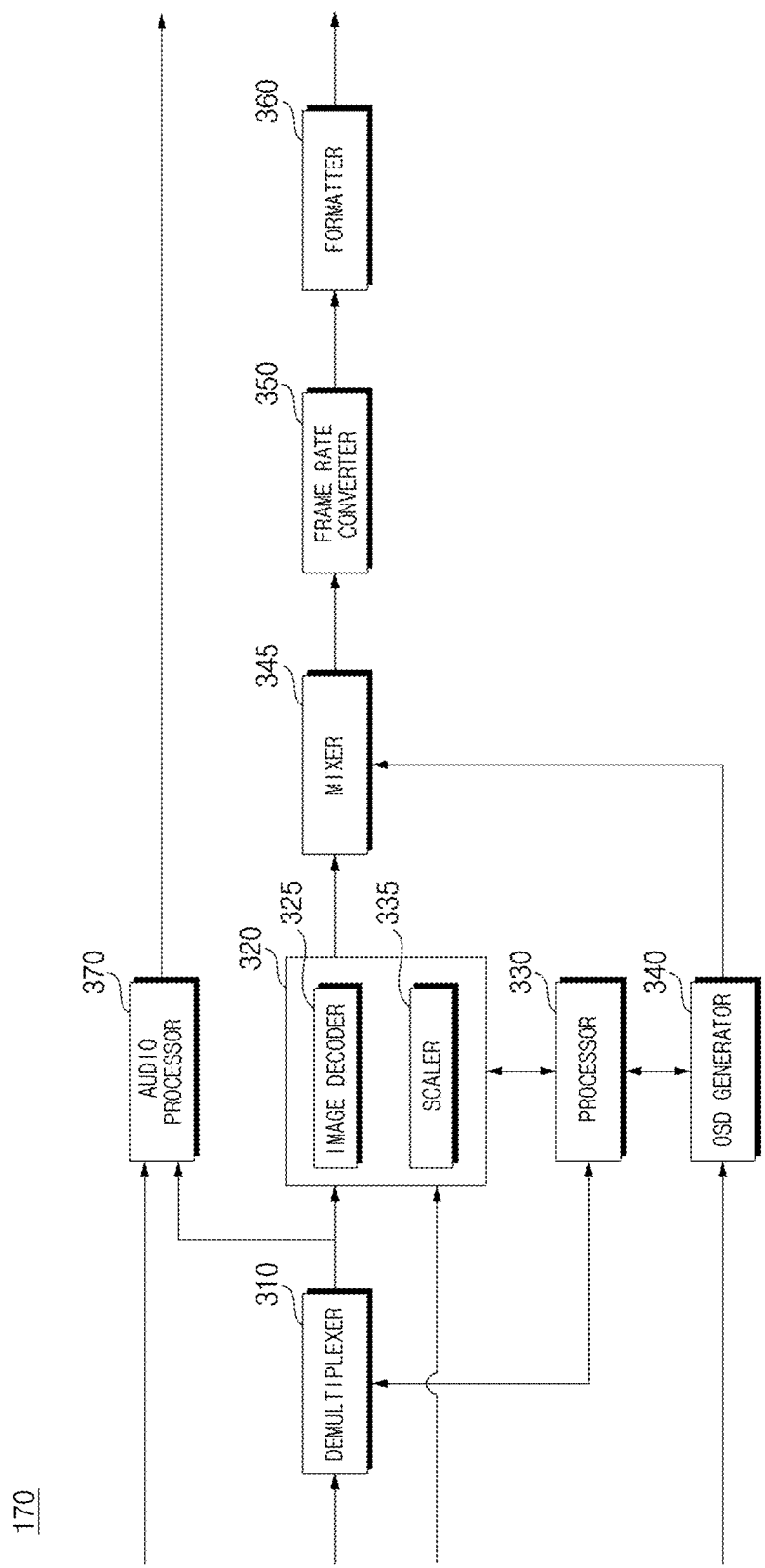
FIG. 3 is an internal block diagram of the controller of FIG. 2.

FIG. 3 is an internal block diagram of the controller of FIG. 2. Referring to FIG. 3, the controller 170 according to an embodiment of the present invention may include a demultiplexer 310, an image processor 320, a processor 330, an OSD generator 340, a mixer 345, a frame rate converter 350, and a formatter 360. The controller 170 may further include an audio processor (not shown) and a data processor (not shown).

The demultiplexer 310 demultiplexes an input stream. For example, when an MPEG-2 TS is input, the demultiplexer 310 may demultiplex the same to separate the stream into an image signal, a voice signal and a data signal. Herein, the stream signal input to the demultiplexer 310 may be a stream signal output from the tuner 110, the demodulator 120 or the external device interface unit 130.

The image processor 320 may perform image processing on the demultiplexed image signal. To this end, the image processor 320 may include an image decoder 325 and a scaler 335. The image decoder 325 decodes the demultiplexed image signal, and the scaler 335 scales the resolution of the decoded image signal such that the image signal can be output through the display 180.

The image decoder 325 may include decoders of various standards. The processor 330 may control overall operations in the image display apparatus 100 or the controller 170. For example, the processor 330 may control the tuner 110 to tune in RF broadcasting corresponding to a channel selected by the user or a pre-stored channel.

In addition, the processor 330 may control the image display apparatus 100 according to a user command input through the user input interface unit 150 or an internal program. The processor 330 may control data transmission with the network interface unit 135 or the external device interface unit 130. The processor 330 may control operations of the demultiplexer 310, the image processor 320 and the OSD generator 340, which are provided in the controller 170.

The OSD generator 340 generates an OSD signal automatically or according to user input. For example, the OSD generator 340 may generate, based on a user input signal, a signal for displaying various kinds of infoiniation in the form of images or text on the screen of the display 180. The generated OSD signal may contain various data including the user interface screen window of the image display apparatus 100, various menu images, widgets, and icons.

The OSD generator 340 may generate a pointer which can be displayed on the display, based on a pointing signal input from the remote controller 200. In particular, the pointer may be generated by a pointing signal processor (not shown), and the OSD generator 340 may include the pointing signal processor. Of course, it is possible to provide the pointing signal processor (not shown) separately from the OSD generator 340.

The mixer 345 may mix the OSD signal generated by the OSD generator 340 and the decoded image signal image-processed by the image processor 320. The FRC 350 may convert the frame rate of an input image. The frame rate converter 350 can output frames without performing frame rate conversion.

The formatter 360 may convert the input signal into an image signal to be transmitted to the display 180. For example, it may convert the input signal into a low voltage differential signal (LVDS) or mint LVDS. The audio processor 370 in the controller 170 may process the demultiplexed audio signal or an audio signal of predetermined content. To this end, the audio processor 370 may include various decoders.

The audio processor 370 in the controller 170 may perform processing such as adjustment of bass, treble, and volume. The data processor (not shown) in the controller 170 may perform data processing on a demultiplexed data signal. For example, if the demultiplexed data signal is a coded data signal, the data processor (not shown) may decode the data signal. The coded data signal may be electronic program guide (EPG) information containing broadcast information such as a start time and end time of a broadcast program broadcast on each channel.

The block diagram of the controller 170 shown in FIG. 3 is simply illustrative. Constituents of the block diagram may be integrated, added or omitted according to the specifications of the controller 170 that is implemented in reality. In particular, the FRC 350 and the formatter 360 may not be provided in the controller 170. Instead, they may be provided individually or as one separate module.

Figure 4:
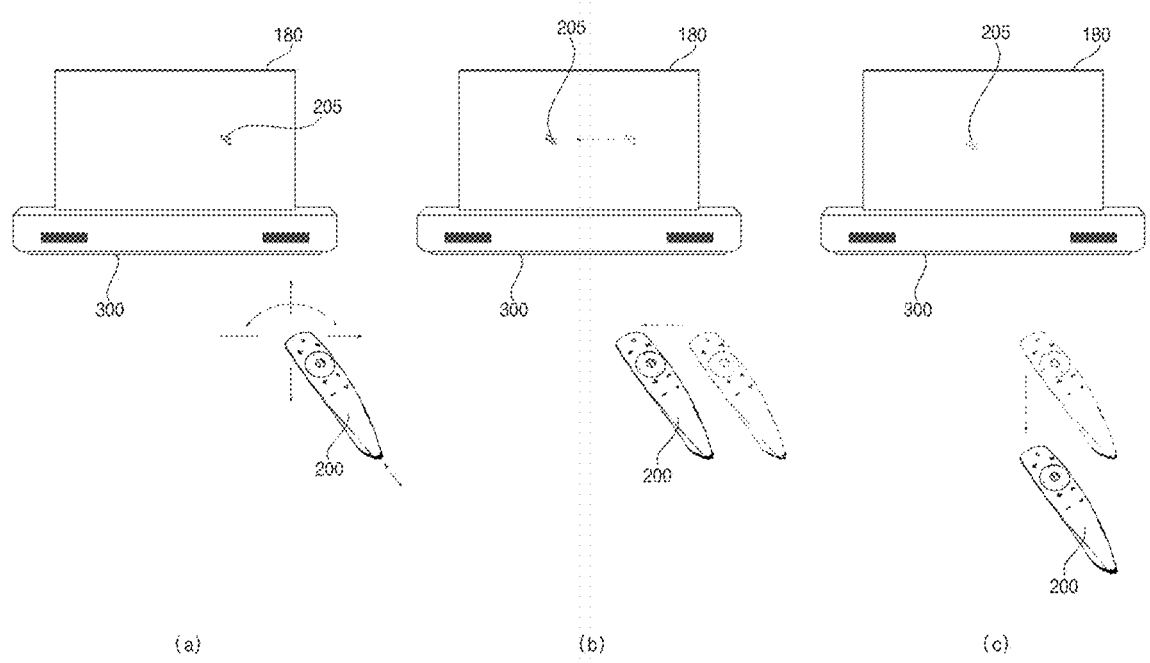
FIG. 4 illustrates a control method of the remote controller of FIG. 2.

FIG. 4 illustrates a control method of the remote controller of FIG. 2. As shown in FIG. 4(*a*), a pointer 205 corresponding to the remote controller 200 may be displayed on the display 180. The user may move the remote controller 200 up and down, left and right (FIG. 4(*b*)), or back and forth (FIG. 4(*c*)) or rotate the same. The pointer 205 displayed on the display 180 of the image display apparatus corresponds to movement of the remote controller 200. As shown in the figure, since the pointer 205 moves according to movement of the remote controller 200 in 3D space, the remote controller 200 may be referred to as a spatial remote controller or a 3D pointing device.

FIG. 4(*b*) illustrates a case where the pointer 205 displayed on the display 180 of the image display apparatus moves to the left when the user moves the remote controller 200 to the left. Information about movement of the remote controller 200 sensed through a sensor of the remote controller 200 is transmitted to the image display apparatus. The image display apparatus may calculate coordinates of the pointer 205 based on the information about the movement of the remote controller 200. The image display apparatus may provide the pointer 205 such that the pointer 205 corresponds to the calculated coordinates.

FIG. 4(c) illustrates a case where the user moves the remote controller 200 away from the display 180 while pressing down a specific button on the remote controller 200. In this case, a selected area of the display 180 corresponding to the pointer 205 may be zoomed in and displayed with the size thereof increased. On the other hand, when the user moves the remote controller 200 closer to the display 180, the selected area may be zoomed out and displayed with the size thereof reduced. Alternatively, the selected area may be zoomed out when the remote controller 200 moves away from the display 180, and may be zoomed in when the remote controller 200 moves closer to the display 180.

Vertical and lateral movement of the remote controller 200 may not be recognized while the specific button on the remote controller 200 is pressed down. That is, when the remote controller 200 approaches or moves away from the display 180, vertical and lateral movement thereof may not be recognized and only back-and-forth movement thereof may be recognized. If the specific button in the remote controller 200 is not pressed down, only the pointer 205 moves according to vertical and lateral movement of the remote controller 200. The speed and direction of movement of the pointer 205 may correspond to the speed and direction of movement of the remote controller 200.

Figure 5:
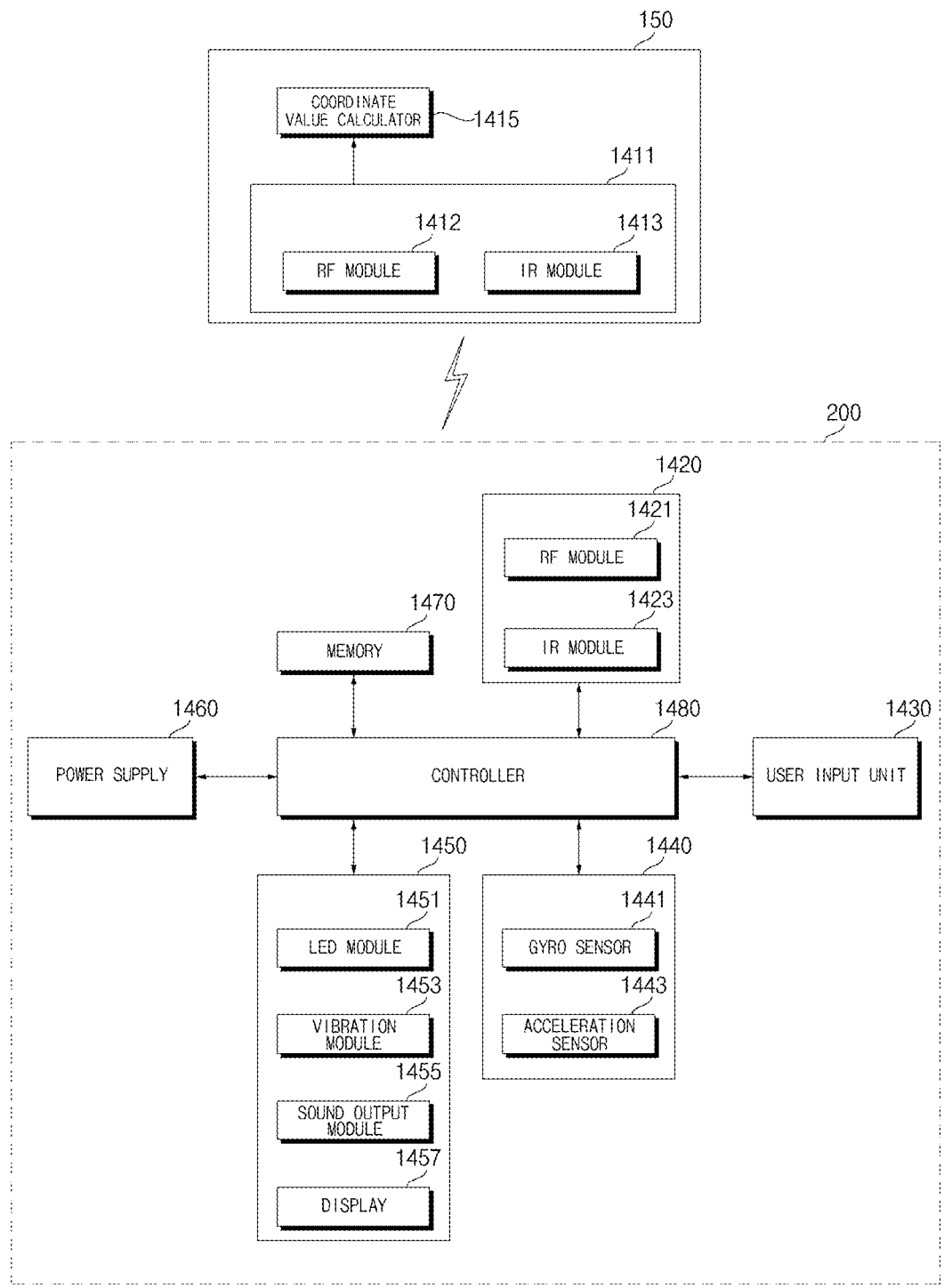
FIG. 5 is an internal block diagram of the remote controller of FIG. 2.

FIG. 5 is an internal block diagram of the remote controller of FIG. 2. Referring to FIG. 5, the remote controller 200 may include a wireless communication unit 1425, a user input unit 1435, a sensor unit 1440, an output unit 1450, a power supply 1460, a MEMORY 1470, and a controller 1480. The wireless communication unit 1425 transmits/receives signals to/from any one of the image display apparatuses according to the embodiments of the present invention described above. Of the image display apparatuses according to the embodiments of the present invention, one image display apparatus 100 will be described as an example.

In this embodiment, the remote controller 200 may include an RF module 1421 capable of transmitting and receiving signals to and from the image display apparatus 100 according to an RF communication standard. The remote controller 200 may further include an IR module 1423 capable of transmitting and receiving signals to and from the image display apparatus 100 according to an IR communication standard.

In this embodiment, the remote controller 200 may transmit a signal containing information about movement of the remote controller 200 and the like to the image display apparatus 100 via the RF module 1421. In addition, the remote controller 200 may receive a signal from the image display apparatus 100 via the RF module 1421. When necessary, the remote controller 200 may transmit commands related to power on/off, channel change, and volume change to the image display apparatus 100 via the IR module 1423.

The user input unit 1435 may include a keypad, a button, a touchpad, or a touchscreen. The user may input a command related to the image display apparatus 100 by manipulating the user input unit 1435. If the user input unit 1435 includes a hard key, the user may input, to the remote controller 200, a command related to the image display apparatus 100 by pressing the hard key. If the user input unit 1435 includes a touchscreen, the user may input, to the remote controller 200, a command related to the image display apparatus 100 by touching a soft key on the touchscreen. The user input unit 1435 may include various kinds of input means such as a scroll wheel and a jog wheel, but it should be noted that this embodiment does not limit the scope of the present invention.

The sensor unit 1440 may include a gyro sensor 1441 or an acceleration sensor 1443. The gyro sensor 1441 may sense information about movement of the remote controller 200. For example, the gyro sensor 1441 may sense information about movement of the remote controller 200 with respect to the X, Y and Z axes. The acceleration sensor 1443 may sense information about the movement speed of the remote controller 200. The sensor unit 1440 may further include a distance measurement sensor to sense a distance to the display 180.

The output unit 1450 may output an image signal or voice signal corresponding to manipulation of the user input unit 1435 or a signal transmitted from the image display apparatus 100. The user may recognize, via the output unit 1450, whether the user input unit 1435 is manipulated or the image display apparatus 100 is controlled. For example, the output unit 1450 may include an LED module 1451 configured to be turned on when signals are transmitted to and received from the image display apparatus 100 via the wireless communication unit 1425, a vibration module 453 configured to generate vibration, a sound output module 1455 configured to output sound, or a display 1457 configured to output an image.

The power supply 1460 supplies power to the remote controller 200. If the remote controller 200 does not move for a predetermined time, the power supply 1460 may stop supplying power to save power. The power supply 1460 may resume supply of power when the predetermined key provided to the remote controller 200 is manipulated.

The memory 1470 may store various kinds of programs and application data necessary for control or operation of the remote controller 200. When the remote controller 200 wirelessly transmits and receives signals to and from the image display apparatus 100 via the RF module 1421, the remote controller 200 and the image display apparatus 100 may transmit and receive signals in a predetermined frequency band. The controller 1480 of the remote controller 200 may store, in the memory 1470, information about, for example, a frequency band enabling wireless transmission and reception of signals to and from the image display apparatus 100, which is paired with the remote controller 200, and reference the same.

The controller 1480 controls operations related to control of the remote controller 200. The controller 1480 may transmit, via the wireless communication unit 1425, a signal corresponding to manipulation of a predetermined key of the user input unit 1435 or a signal corresponding to movement of the remote controller 200 sensed by the sensor unit 1440 to the image display apparatus 100.

The user input interface unit 150 of the image display apparatus 100 may include a wireless communication unit 151 capable of wirelessly transmitting and receiving signals to and from the remote controller and a coordinate calculator 1415 capable of calculating coordinates of the pointer corresponding to operation of the remote controller 200. The user input interface unit 150 may wirelessly transmit and receive signals to and from the remote controller 200 via an RF module 1412. In addition, the user input interface unit 150 may receive, via an IR module 1413, a signal transmitted from the remote controller 200 according to an IR communication standard.

The coordinate calculator 1415 may calculate coordinates (x, y) of the pointer 202 to be displayed on the display 180, by correcting the unstable position of a hand or an error in a signal corresponding to operation of the remote controller 200 which is received via the wireless communication unit 151. The transmitted signal of the remote controller 200 input to the image display apparatus 100 via the user input interface unit 150 is transmitted to the controller 180 of the image display apparatus 100. The controller 180 may determine information about an operation of the remote controller 200 or manipulation of a key based on the signal transmitted from the remote controller 200, and control the image display apparatus 100 according to the information.

As another example, the remote controller 200 may calculate coordinates of the pointer corresponding to movement thereof and output the same to the user input interface unit 150 of the image display apparatus 100. In this case, the user input interface unit 150 of the image display apparatus 100 may transmit, to the controller 180, information about the received coordinates of the pointer without separately correcting the unstable position of the hand or error. As another example, in contrast with the example of the figure, the coordinate calculator 1415 may be provided in the controller 170 rather than in the user input interface unit 150.

Figure 6:
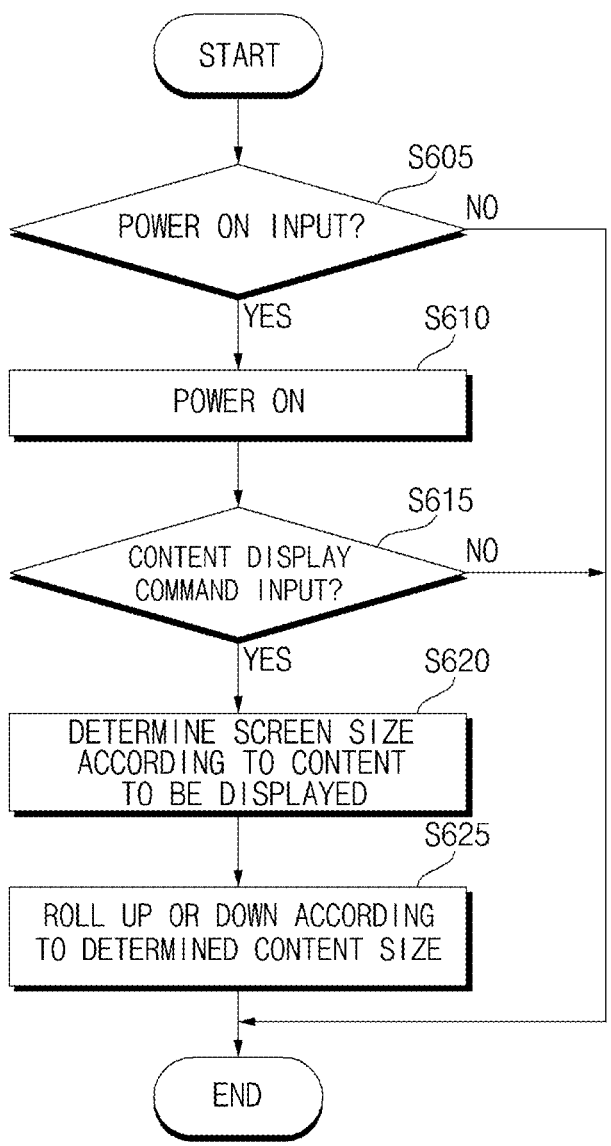
FIG. 6 is a flowchart illustrating an operation method of an image display apparatus having a rollable display according to an embodiment of the present invention.

FIG. 6 is a flowchart illustrating an operation method of an image display apparatus having a rollable display according to an embodiment of the present invention, and FIGS. 7A to 16D are views referencing the operation. First, when there is a power-on input (S605), the controller 170 of the image display apparatus 100 may control power to be supplied to the signal processing device 300 (S610).

Particularly, if there is no separate input after the power-on input, the controller 170 of the image display apparatus 100 may operate in a standby mode, in which only a part of the units in the signal processing device 300 may operate and power may not be supplied to the display 180. For example, the controller 170 of the image display apparatus 100 may be in the standby mode and control power to be supplied only to the user input interface unit 150. Alternatively, the controller 170 may control power to be further supplied to the network interface unit 135 and the external device interface unit 130.

Next, when a content display command is given (S615), the controller 170 of the image display apparatus 100 may determine the size of the display 180 according to the attribute of the content to be displayed (S620) and control the drive unit 175 to roll the display 180 up or down according to the determined size (S625). Specifically, the controller 170 of the image display apparatus 100 may determine the height of the display 180 according to the attribute of the content to be displayed, and control the drive unit 175 to roll the display 180 up or down according to the determined height.

Accordingly, the height of the display may be changed according to the attribute of the content. In addition, by changing the height of the display according to the attribute of the content, unnecessary power consumption may be reduced.

Figure 7A:
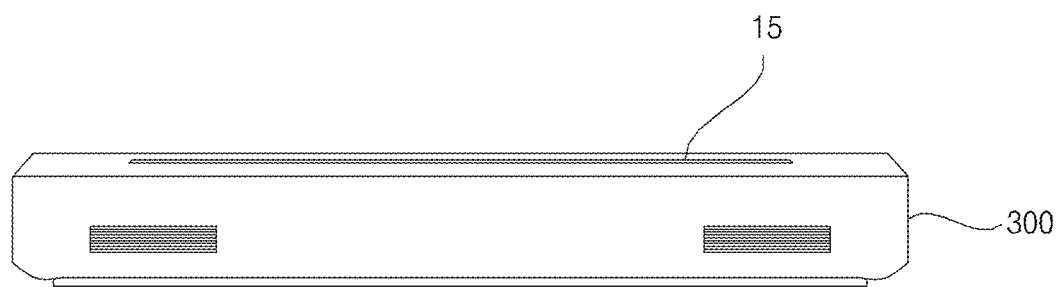
FIGS. 7A to 16D are views referred to in the description of the operation method of FIG. 6.

FIG. 7A illustrates the signal processing device 300 of the image display apparatus 100 set in the standby mode after being powered on. The rollable display 180 is wound around a roller in the signal processing device 300, and is not exposed to the outside of the opening 150.

Figure 7B:
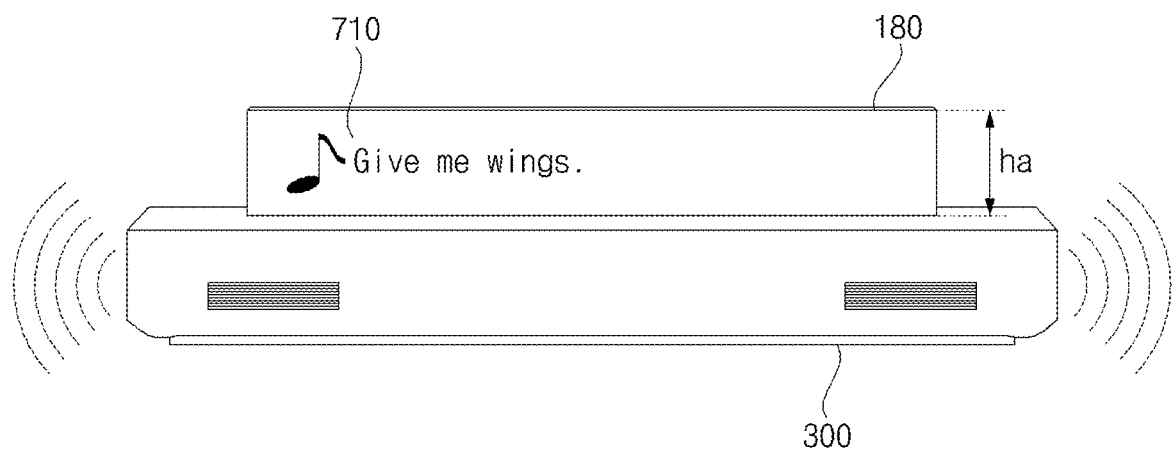

Next, FIG. 7B illustrates that the rollable display 180 is rolled up according to a music playback command and thus the height of the rollable display 180 is ha. The controller 170 of the image display apparatus 100 may perform a control operation to play music and output sound according to the music playback command and further control the rollable display 180 to be rolled up to have a height equal to ha. Here, ha may be approximately 20 cm.

In playing back music, the controller 170 of the image display apparatus 100 may control music playback information to be displayed on the rollable display 180 having the height of ha. Thereby, the user can check the relevant information while listening to the music. The music played in FIG. 7B may be from a music file stored in the internal memory or a music file stored in an external device.

Alternatively, the music may be streamed and output from the network interface unit 135 or the external device interface unit 130. The music played in FIG. 7B may be radio music received through the tuner 110.

Figure 7C:
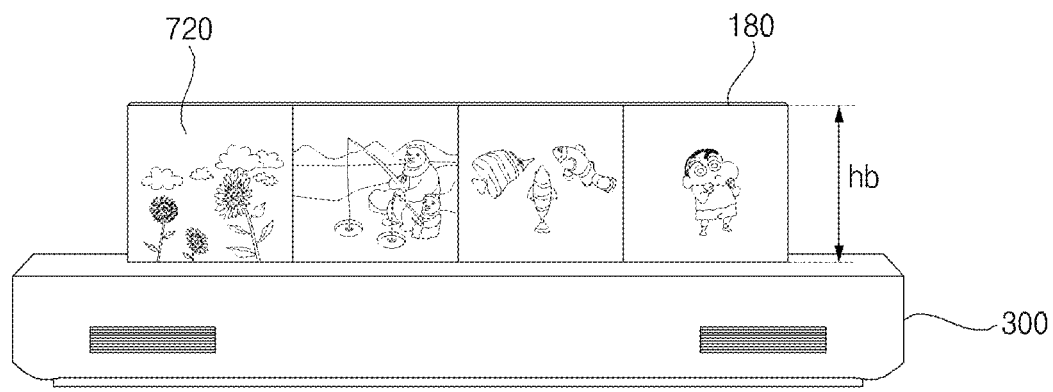

Next, FIG. 7C illustrates that the rollable display 180 is rolled up according to a search command and thus the height of the rollable display 180 is hb. The controller 170 of the image display apparatus 100 may perform a search according to the search command and control a search result to be displayed. In addition, the controller 170 may control the rollable display 180 to be rolled up such that the height of the rollable display 180 becomes hb. Here, hb may be greater than ha and may be approximately 40 cm. In the example of FIG. 7C, a thumbnail list 720 is displayed as a search result.

Referring to FIGS. 7B and 7C, when the content to be displayed is audio content, the controller 170 may control the size of the display 180 to be reduced compared to the size given when the content to be displayed is video content. Thus, in playing back music, unnecessary power consumption may be reduced.

Figure 7D:
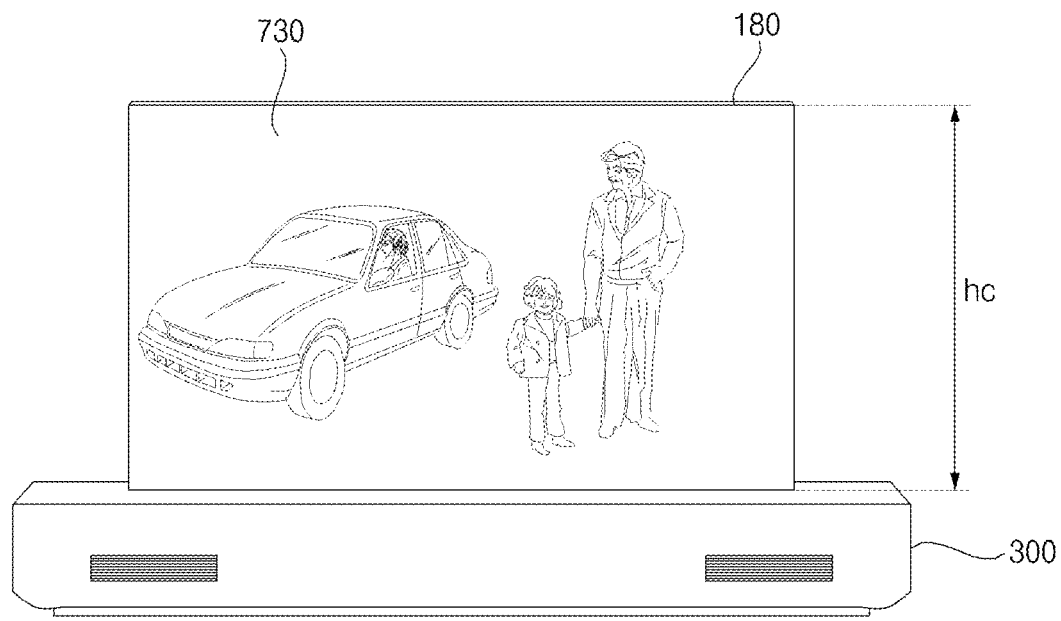

Next, FIG. 7D illustrates that the rollable display 180 is rolled up according to a broadcast image display command such that the height of the rollable display 180 is hc. The controller 170 of the image display apparatus 100 may perform a control operation to receive broadcast content and output a broadcast image and broadcast sound according to a broadcast image display command, and may also control the rollable display 180 to be rolled up such that the height of the rollable display 180 becomes hc. Here, hc may be greater than hb and may be approximately 100 cm.

Figure 7E:
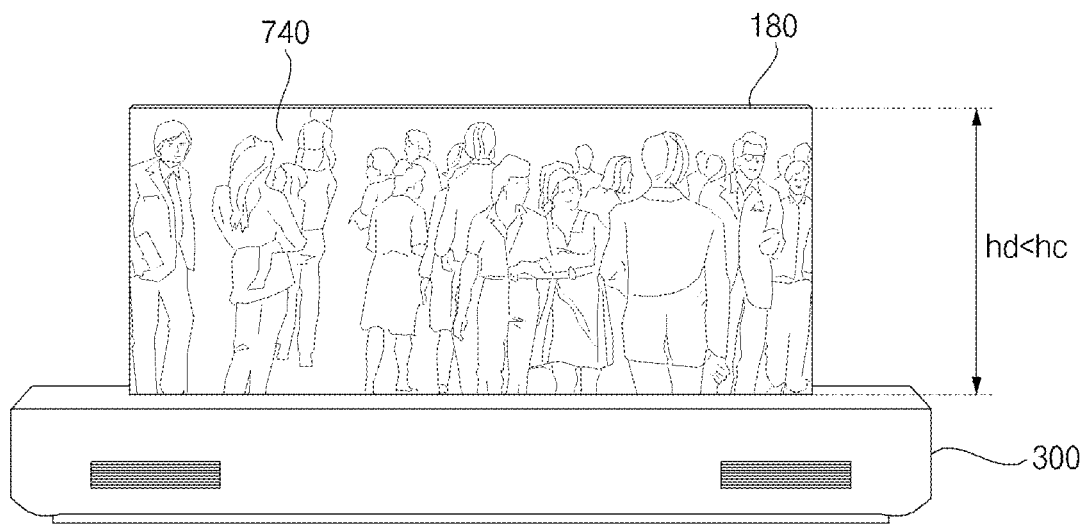

Next, FIG. 7E illustrates that the rollable display 180 is rolled up according to a movie image display command such that the height of the rollable display 180 is hd. The controller 170 of the image display apparatus 100 may perform a control operation to receive movie content and output a movie image and movie sound, and may also control the rollable display 180 to be rolled up such that the height of the rollable display 180 becomes hd. Here, hd may be less than hc and may be approximately 80 cm.

Referring to FIGS. 7D and 7E, to switch from a 16:9 broadcast image to a 21:9 movie image in displaying images, the horizontal length of the display 180 may need to be increased. In the present invention, since the vertical length of the display 180 cannot be changed, the height of the display 180 is preferably controlled to be reduced. That is, when the content to be displayed is a 21:9 movie image, the controller 170 of the image display apparatus 100 may control the height of the display 180 to be reduced compared to the height given when the content to be displayed is a 16:9 broadcast image. Accordingly, as the size of the display is adjusted to a size proper for the size of the original content, the feeling of immersion in viewing the content may be further enhanced.

Figure 7F:
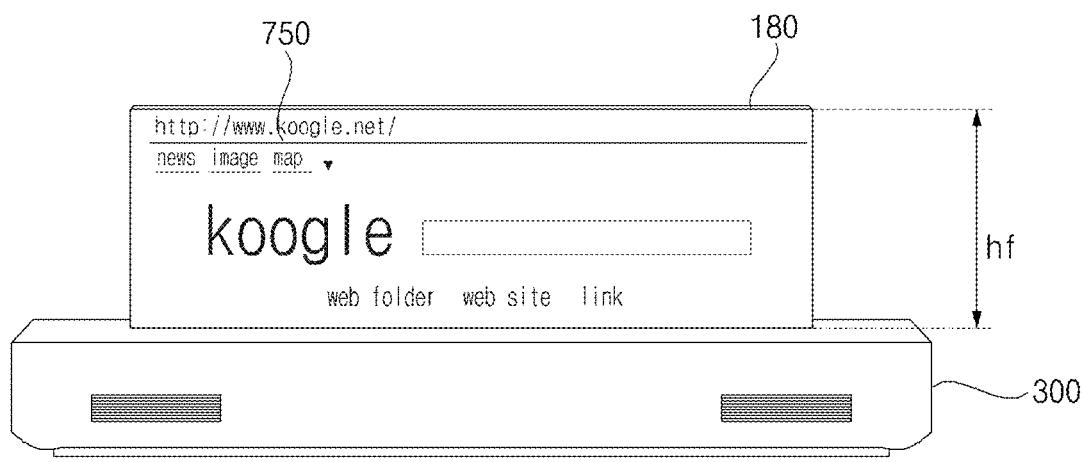

Next, FIG. 7F illustrates that the rollable display 180 is rolled up or down according to a web screen display command for search such that the height of the rollable display 180 is hf. The controller 170 of the image display apparatus 100 performs a control operation according to the web screen display command for search to connect, through the network interface unit 135, to a server providing a search service, and receives web screen information for search from the server.

Then, the controller 170 of the image display apparatus 100 controls a web screen for search to be displayed, based on the received web screen information for search, and may also control the rollable display 180 to be rolled up or down such that the height of the rollable display 180 becomes hf. Here, hf may be approximately 60 cm.

Figure 7G:
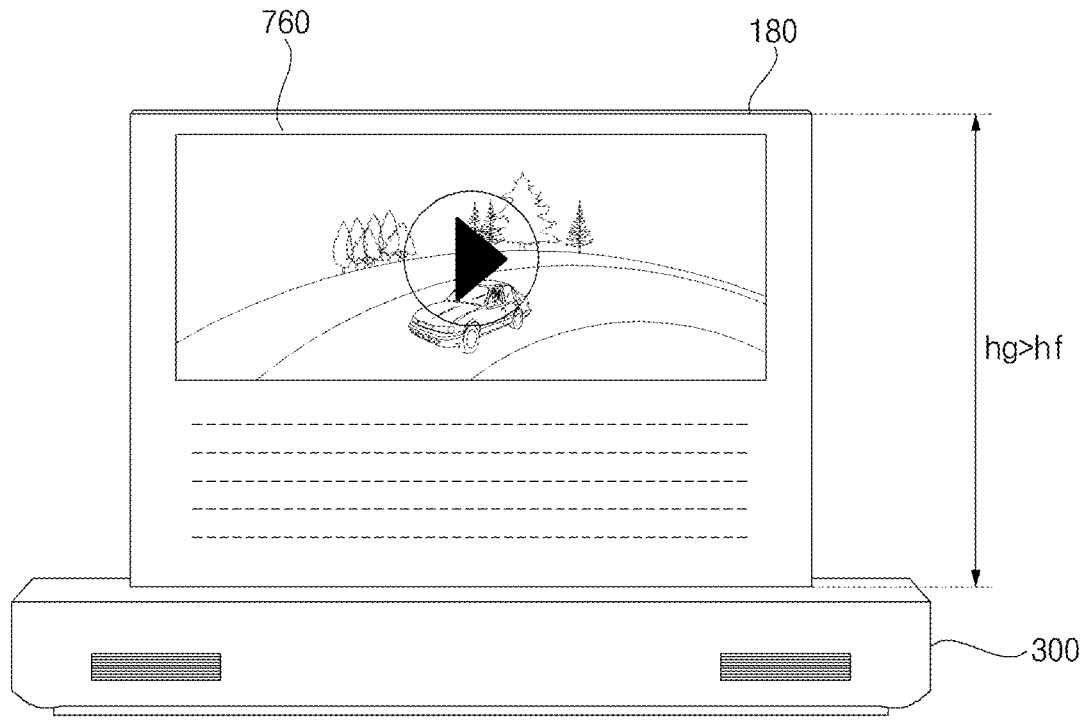

Next, FIG. 7G illustrates that the rollable display 180 is rolled up or down according to a web screen display command for reproduction of a moving image such that the height of the rollable display 180 is hg. The controller 170 of the image display apparatus 100 performs a control operation according to the web screen display command for reproduction of a moving image to connect to a server providing a moving image reproduction service, and receives web screen information for reproduction of a moving image from the server.

Then, the controller 170 of the image display apparatus 100 controls a web screen for reproduction of a moving image to be displayed, based on the web screen information for the received web screen information for reproduction of a moving image, and may also control the rollable display 180 to be rolled up or down such that the height of the rollable display 180 becomes hg. Here, hg is greater than hf and may be approximately 110 cm.

Referring to FIGS. 7F and 7G, the height of the rollable display 180 in FIG. 7G where the amount of data on the web screen is large is preferably greater than the height in FIG. 7F. That is, the controller 170 of the image display apparatus 100 may control the height of the display 180 to change according to the amount of data of the content to be displayed.

Figure 7H:
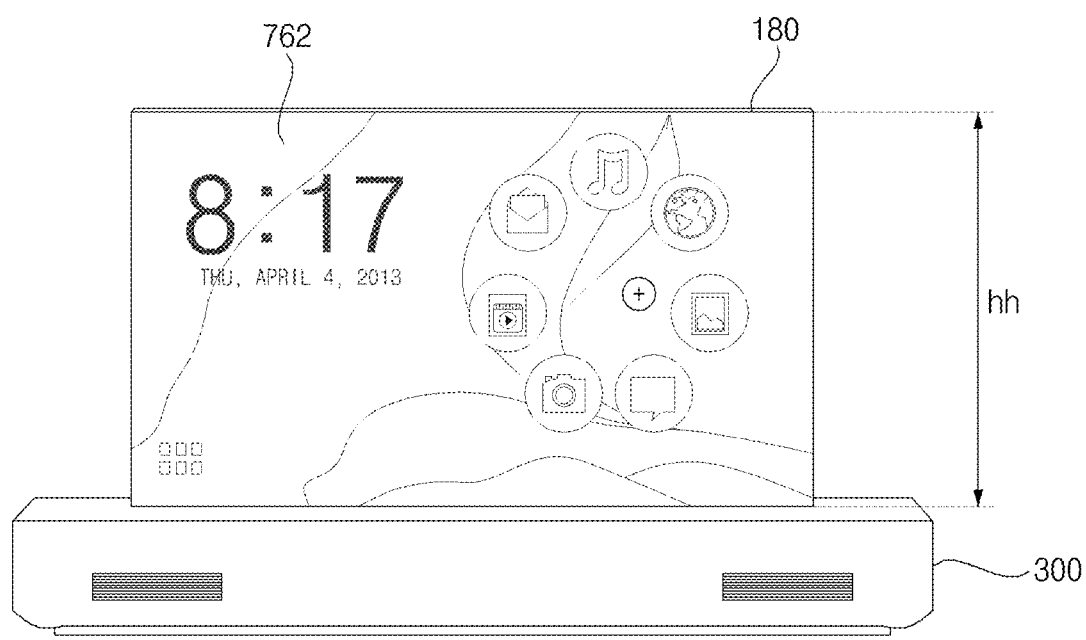

Next, FIG. 7H illustrates that a background image of PC screen images is displayed according to a PC screen image display command, and the rollable display 180 is rolled up or down such that the height of the rollable display 180 is hh. The controller 170 of the image display apparatus 100 may receive a background image from a PC, which is an external PC, through the external device interface 130 according to the PC screen image display command.

Then, the controller 170 of the image display apparatus 100 may control the received background image of the PC to be displayed, and also control the rollable display 180 to be rolled up or down such that the height of the rollable display 180 becomes hh. Here, hh may be approximately 90 cm.

Figure 7I:
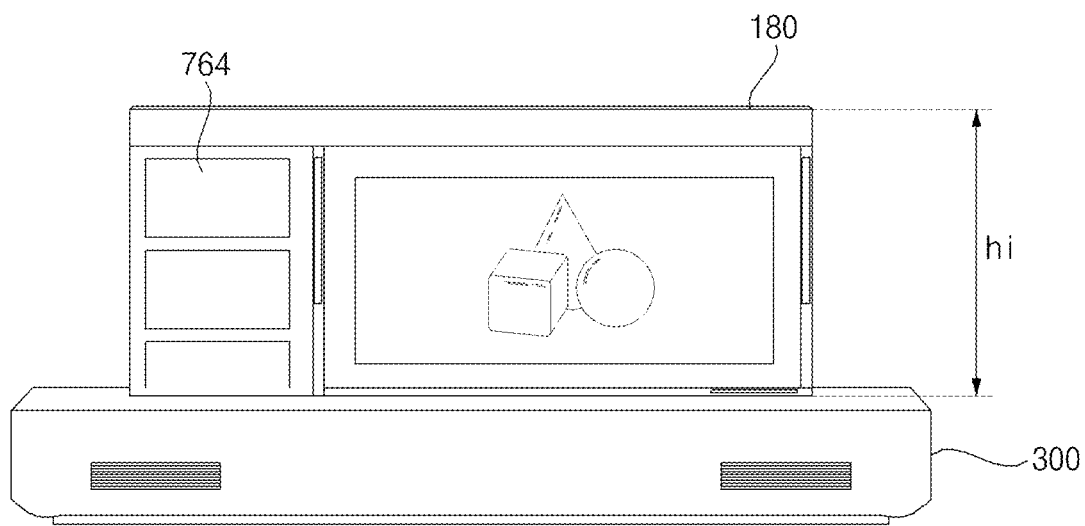

Next, FIG. 7I illustrates that a presentation document image (PPT screen) of the PC screen images is displayed according to a PC screen image display command, and the rollable display 180 is rolled up or down such that the height of the rollable display 180 is hi. The controller 170 of the image display apparatus 100 may receive a presentation document image from a PC, which is an external PC, through the external device interface unit 130 according to the PC screen image display command.

Then, the controller 170 of the image display apparatus 100 may control the received presentation document image to be displayed and also control the rollable display 180 to be rolled up or down such that the height of the rollable display 180 becomes hi. Here, hi may be approximately 70 cm.

Figure 7J:
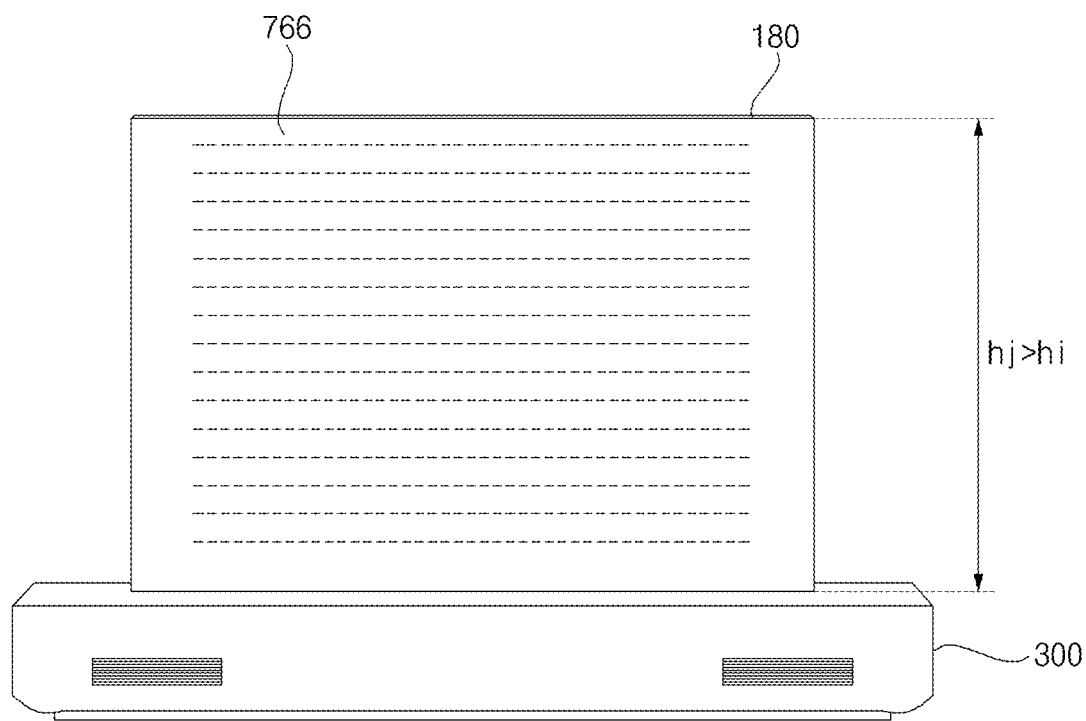

Next, FIG. 7J illustrates that a document creation image (DOC screen) of the PC screen images is displayed according to a PC screen image display command, and the rollable display 180 is rolled up or down such that the height of the rollable display 180 is hi. The controller 170 of the image display apparatus 100 may receive a document creation image from a PC, which is an external device, through the external device interface unit 130 according to the PC screen image display command.

Then, the controller 170 of the image display apparatus 100 may control the received document creation image to be displayed and also control the rollable display 180 to be rolled up or down such that the height of the rollable display 180 becomes hj. Here, hj may be approximately 120 cm.

Referring to FIGS. 7H and 7J, the height of the document creation image of FIG. 7J is greater than the width of the document creation image, and accordingly the height of the display 180 for the document creation image of FIG. 7J is preferably greater than the height of the display 180 for the background image of FIG. 7H.

Accordingly, in when the content to be displayed is a document creation image executed on the PC, the controller 170 of the image display apparatus 100 may control the height of the display 180 to be increased over the height given when the content to be displayed is the background image of the PC.

Referring to FIGS. 7H and 7I, the width of the presentation document image of FIG. 7I is greater than the height of the presentation document image, and accordingly the height of the display 180 for the presentation document image of FIG. 7I is preferably less than the height of the display 180 for the background image of FIG. 7H.

Accordingly, when the content to be displayed is a presentation document image executed on the PC, the controller 170 of the image display apparatus 100 may control the height of the display 180 to be decreased over the height given when the content to be displayed is the background image of the PC.

Figure 7K:
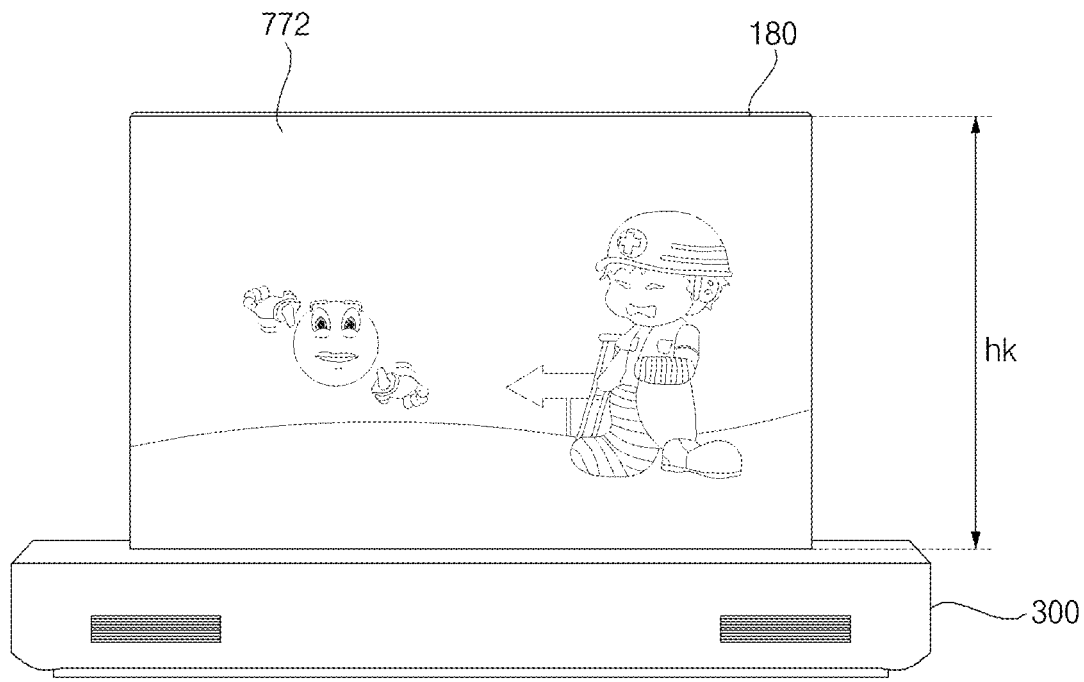

Next, FIG. 7K illustrates that a single-player game image is displayed according to a game image display command, and the rollable display 180 is rolled up or down such that the height of the rollable display 180 is hk. The controller 170 of the image display apparatus 100 may receive a single-player game image from a gaming device, which is an external device, through the external device interface unit 130 according to a game image display command.

Then, the controller 170 of the image display apparatus 100 may control the received single-player game image to be displayed, and also control the rollable display 180 to be rolled up or down such that the height of the rollable display 180 becomes hk. Here, hk may be approximately 85 cm.

Figure 7L:
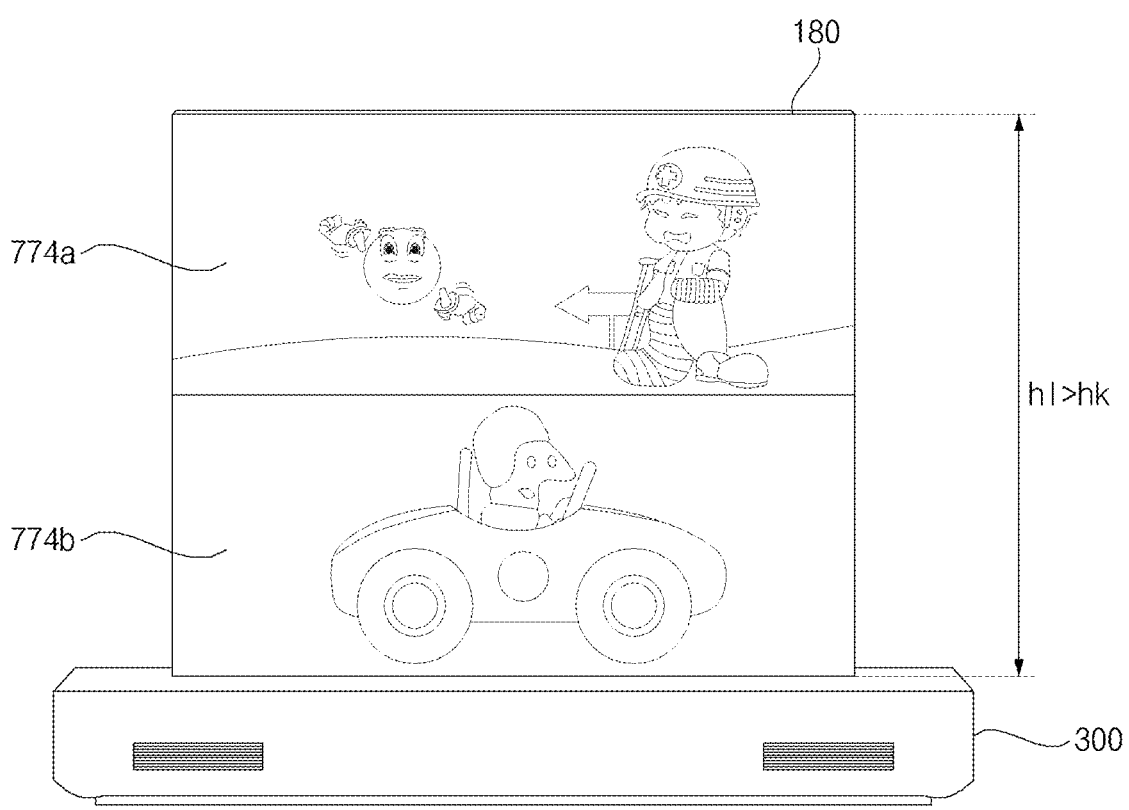

Next, FIG. 7L illustrates that a two-player game image is displayed according to a game image display command, and the rollable display 180 is rolled up or down such that the height of the rollable display 180 is hk. The controller 170 of the image display apparatus 100 may receive a two player-game image from a gaming device, which is an external device, through the external device interface unit 130 according to a game image display command.

Then, the controller 170 of the image display apparatus 100 may control the received two player-game image to be displayed, and also control the rollable display 180 to be rolled up or down such that the height of the rollable display 180 becomes h1. Here, h1 may be approximately 120 cm.

Referring to FIGS. 7K and 7L, when the content to be displayed is a two player-game image, the controller 170 of the image display apparatus 100 may control the height of the display 180 to be increased above the height given when the content to be displayed is a single-player game image. For example, even if the single-player game image and the two-player game image are input with the same height, the controller 170 of the image display apparatus 100 may detect a boundary region or the like in the images to identify the two-player game image, and correspondingly increase the height of the rollable display 180. Accordingly, user convenience may be enhanced in displaying game images.

Figure 8A:
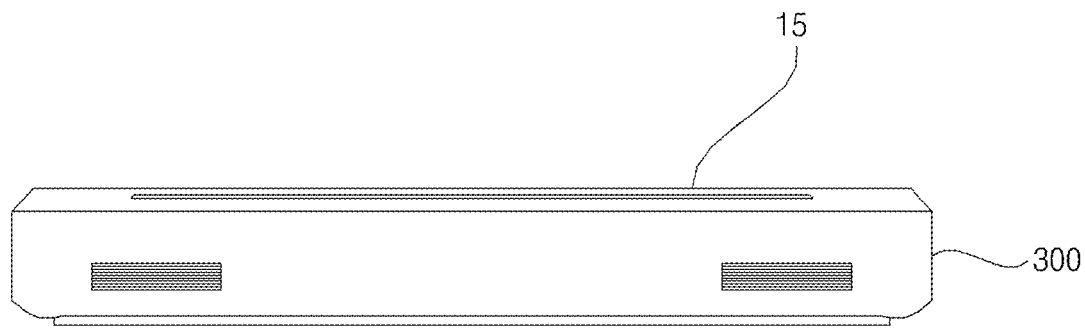

FIG. 8A illustrates the signal processing device 300 of the image display apparatus 100 set in the standby mode after being powered on, similar to FIG. 7A. Thus, the rollable display 180 is wound around the roller in the signal processing device 300 and is not exposed to the outside of the opening 150.

Figure 8B:
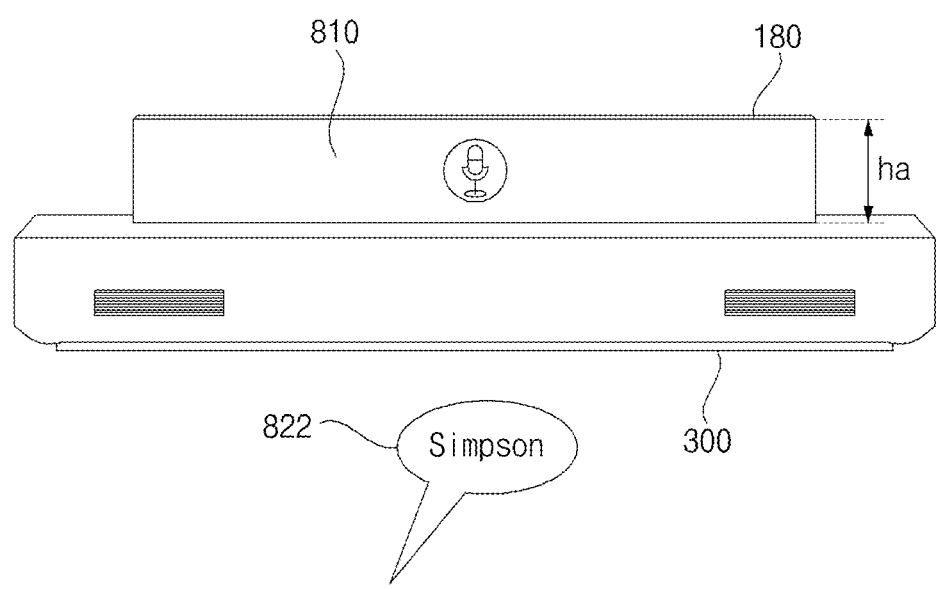

Next, FIG. 8B illustrates operation of the image display apparatus 100 for voice recognition when a user voice input 822 is provided. When voice input is provided by the user, the controller 170 of the image display apparatus 100 may enter the voice recognition mode and display an object 810 indicating the voice recognition mode. To this end, the controller 170 of the image display apparatus 100 may control the rollable display 180 to be rolled up or down to have the height of ha. Thus, the user may intuitively recognize that voice recognition is possible.

Figure 8C:
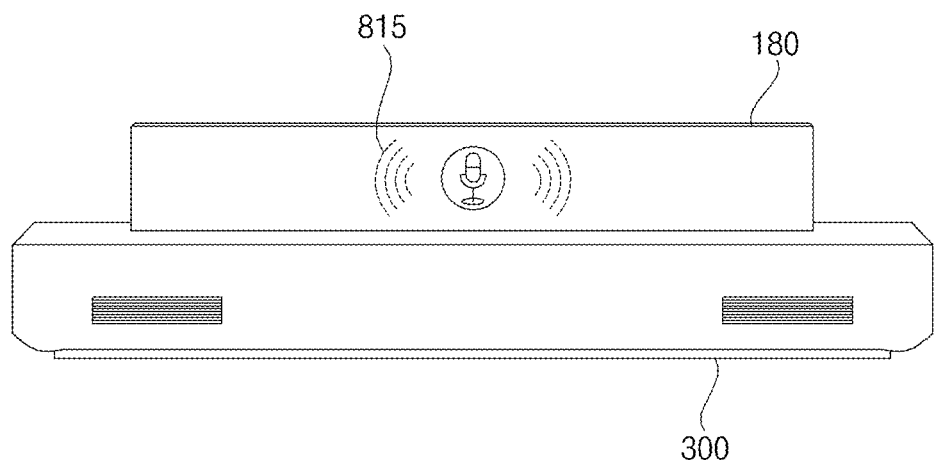
Figure 8D:
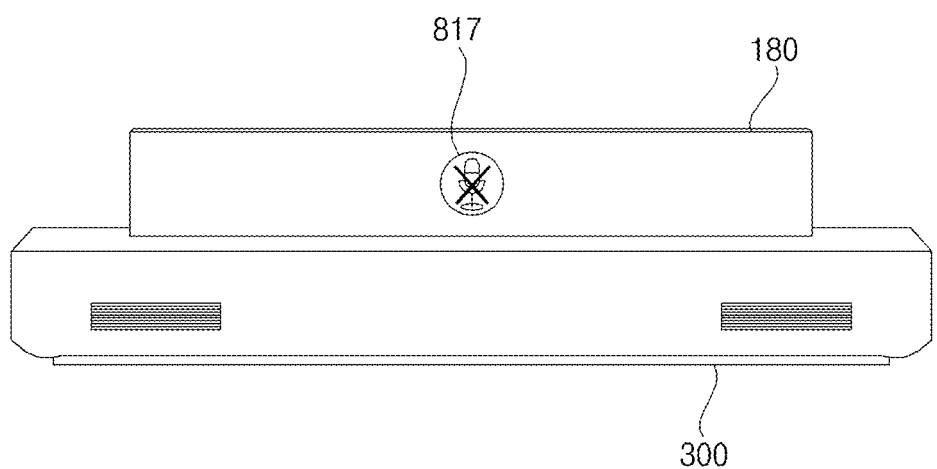

Next, FIG. 8C illustrates that an object 815 indicating that voice recognition is being performed is displayed on the rollable display 180 based on voice input 822 from the user. Accordingly, the user may intuitively recognize that voice recognition is being performed. Next, FIG. 8D illustrates that an object 817 indicating voice recognition failure is displayed on the rollable display 180 based on the voice input 822 from the user. Accordingly, the user may intuitively recognize the voice recognition failure.

Figure 8E:
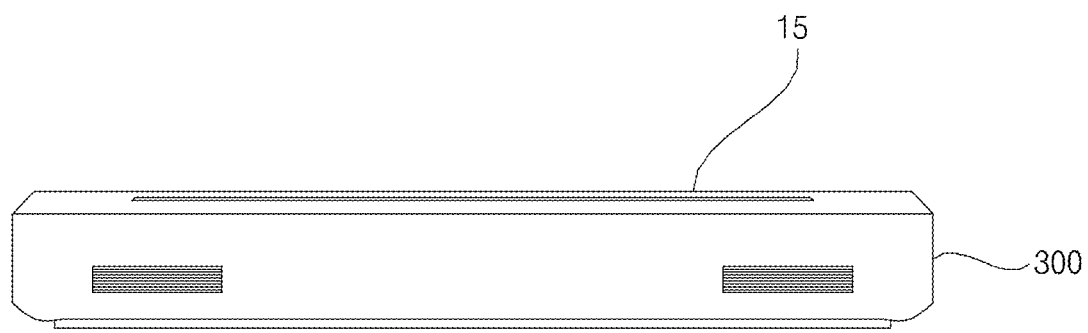
Figure 8F:
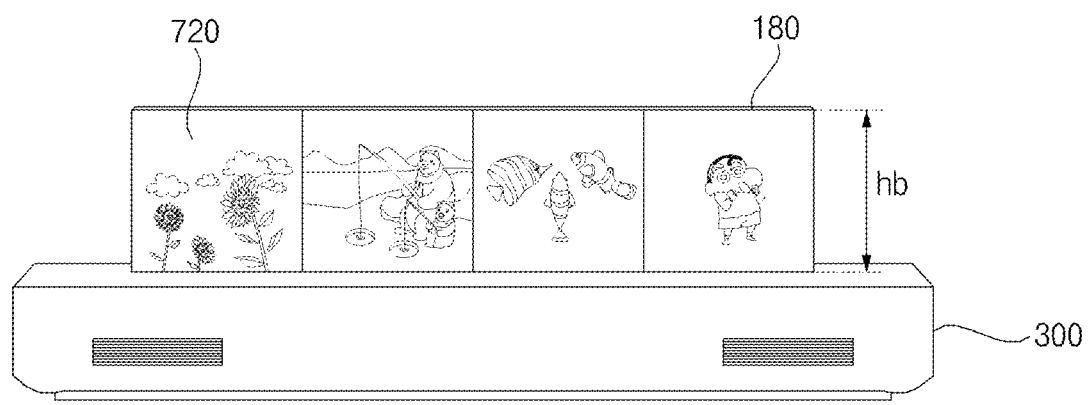

Next, FIG. 8E illustrates that the rollable display 180 is rolled down and wound around the roller in the signal processing device 300 so as not to be exposed to the outside of the opening 150 based on termination of the voice recognition mode. Next, FIG. 8F illustrates that, a search is performed according to the voice input 822 from the user and a thumbnail list 720 representing the search result is displayed.

In this operation, the controller 170 of the image display apparatus 100 may perform a control operation to perform a search according to a search command and display a search result, and also control the rollable display 180 to be rolled up such that the height of the rollable display 180 becomes hb.

Figure 8G:
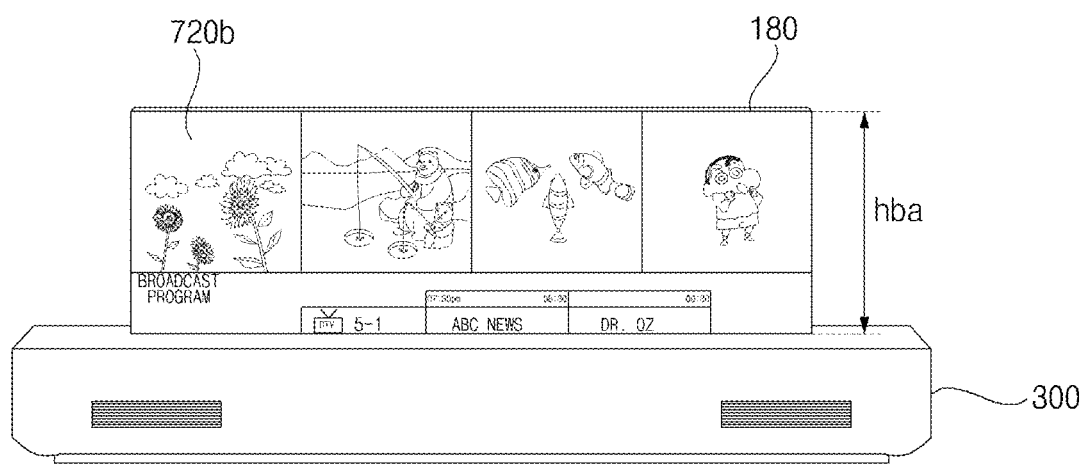

Next, FIG. 8G illustrates that a search is performed according to the voice input 822 from the user, and a result image 720b representing the corresponding result is displayed. In comparison with FIG. 8F, as the rollable display 180 is rolled up, the height of the rollable display 180 becomes hba, and more search results are displayed in the search result image 720b. Particularly, in addition to the thumbnail nail list 720 of FIG. 8F, the content of the search result is further added to the lower portion of the search result image 720b.

Figure 8H:
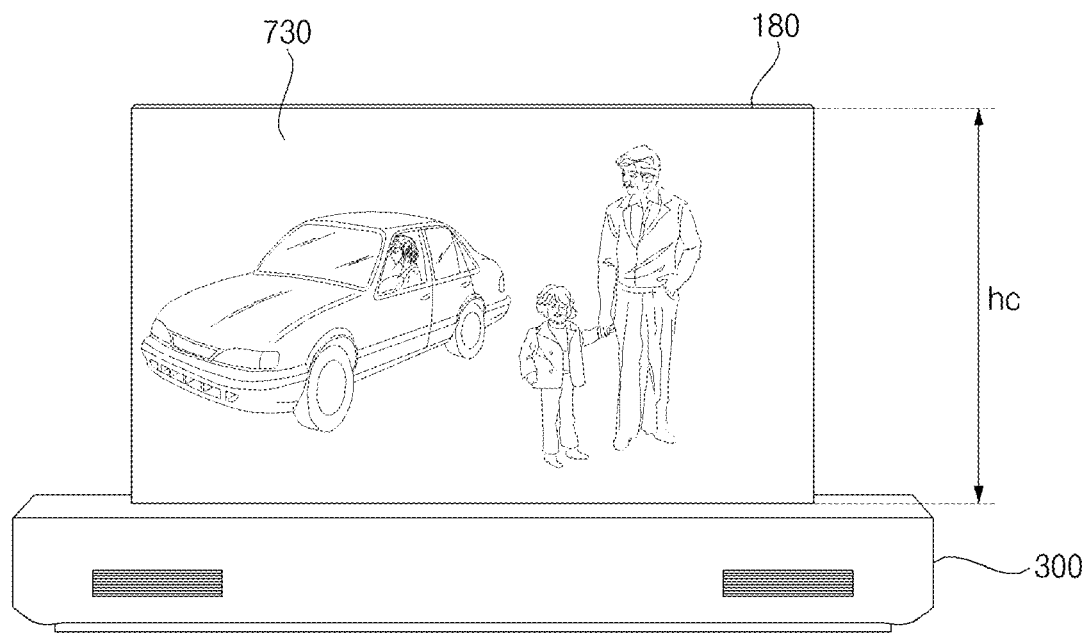

Next, FIG. 8H illustrates a search performed according to the voice input 822 from the user, and an image 730 corresponding to one item in the search result is displayed.

In this case, the controller 170 of the image display apparatus 100 may control the rollable display 180 to be rolled up to have the height of hc in order to display the image 730. Accordingly, the display may be rolled up in accordance with the image desired by the user.

Figure 9A:
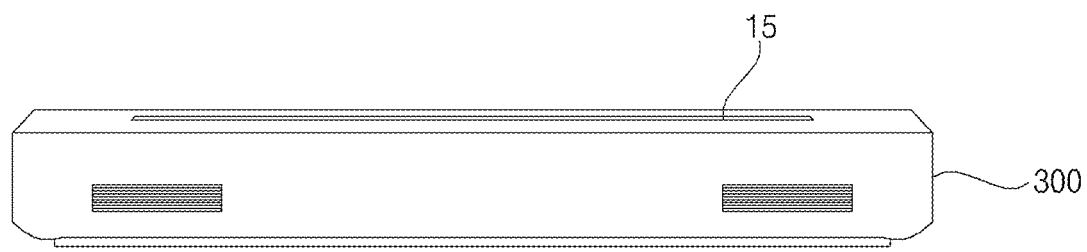

FIG. 9A illustrates the signal processing device 300 of the image display apparatus 100 set in the standby mode after being powered on, similar to FIG. 7A. Thus, the rollable display 180 is wound around the roller in the signal processing device 300 and is not exposed to the outside of the opening 150. When a home screen is input through the remote controller 200 or the like in the standby mode, the controller 170 of the image display apparatus 100 may control the home screen to be displayed.

The home screen may display a broadcast image and an application list shown under the broadcast image. The controller 170 of the image display apparatus 100 may roll up the rollable display 180 to display the home screen. In this case, different images may be controlled to be displayed according to the height of the rollable display 180.

Figure 9B:
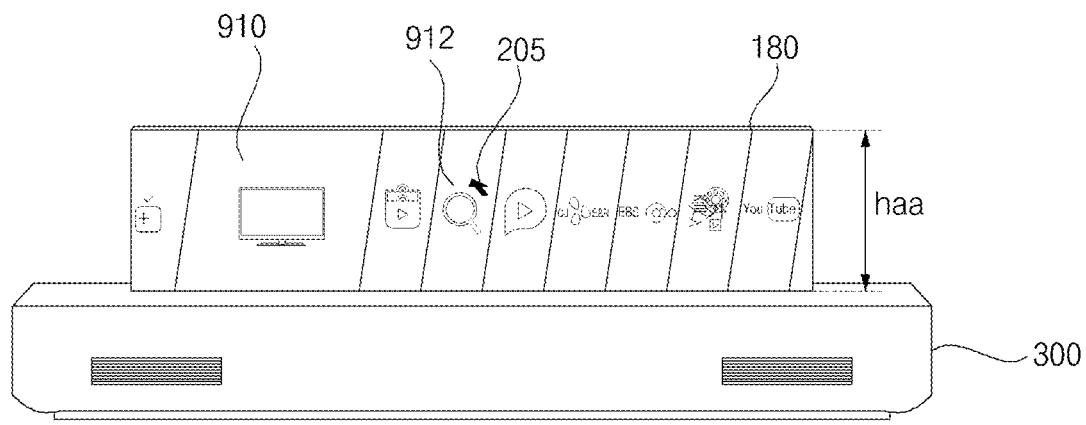

For example, as shown in FIG. 9B, when the height of the display 180 is has during rolling up, the controller 170 of the image display apparatus 100 may control an application list 910 having a plurality of application items to be displayed. Thereafter, when rolling up of the rollable display 180 is completed, the controller 170 of the image display apparatus 100 may perform a control operation to display the home screen on which the application list 910 and a broadcast image are displayed together.

Figure 9C:
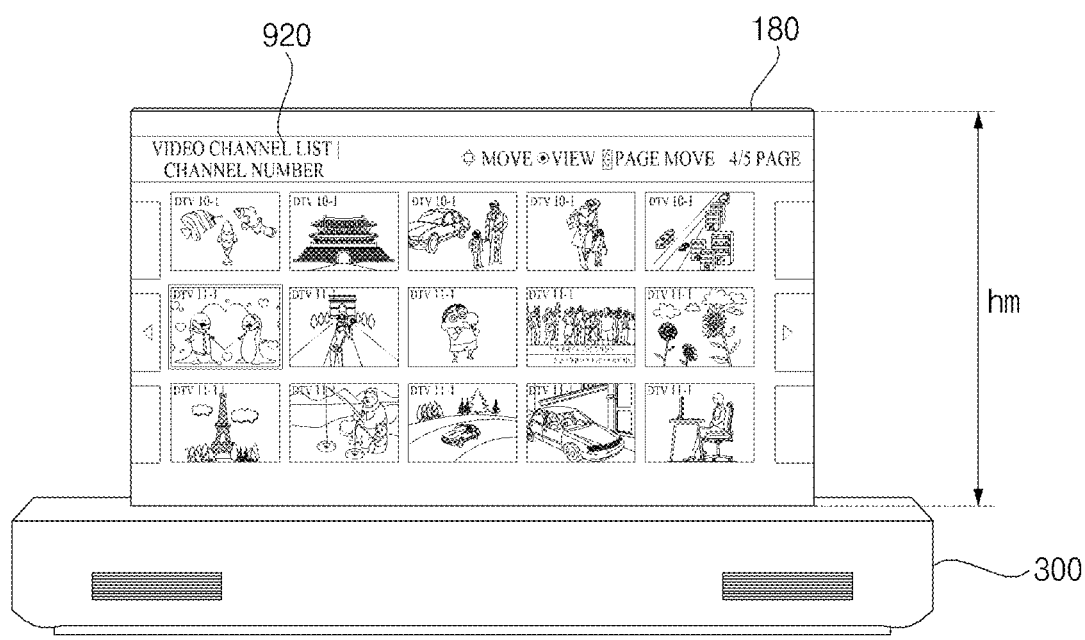

When an item is selected in the application list 910 by the pointer 205 of the remote controller 200 while the height of the rollable display 180 is haa as shown in FIG. 9B, the controller 170 of the image display apparatus 100 may control a screen image corresponding to the selected item to be displayed as shown in FIG. 9C.

FIG. 9B illustrates selecting a thumbnail item. That is, as shown in FIG. 9C, the controller 170 of the image display apparatus 100 may control the rollable display 180 to be rolled up such that the height of the rollable display 180 becomes hm, and control a screen image 920 corresponding to the selected item to be displayed.

The controller 170 of the image display apparatus 100 may control the application list to be displayed on the display 180 when the height of the display 180 is a first height. When an item is selected in the application list by the pointer, which is displayed according to movement of the remote controller 200, the controller 170 may control the display 180 to be rolled up to have a second height greater than the first height in order to display the screen image of the selected application. Details will be described with reference to FIGS. 10A to 10D below.

Figure 10A:
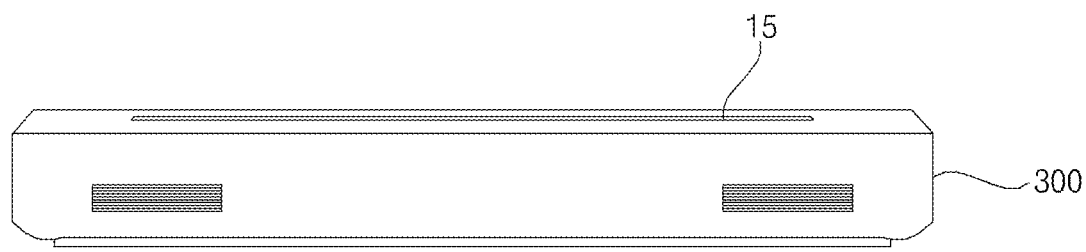

FIG. 10A illustrates the signal processing device 300 of the image display apparatus 100 set in the standby mode after being powered on, similar to FIG. 7A. Thus, the rollable display 180 is wound around the roller in the signal processing device 300 and is not exposed to the outside of the opening 150.

When a home screen is input through the remote controller 200 or the like in the standby mode, the controller 170 of the image display apparatus 100 may control the home screen to be displayed. The home screen may display a broadcast image and an application list shown under the broadcast image.

The controller 170 of the image display apparatus 100 may roll up the rollable display 180 to display the home screen. In this case, different images may be controlled to be displayed according to the height of the rollable display 180.

Figure 10B:
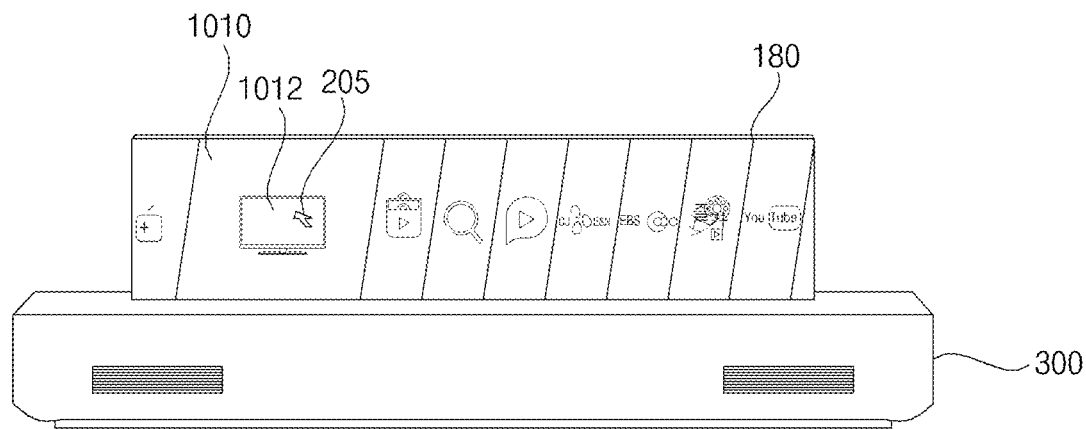

For example, as shown in FIG. 10B, when the height of the display 180 is haa during rolling up, the controller 170 of the image display apparatus 100 may control an application list 1010 having a plurality of application items to be displayed.

Thereafter, when rolling up of the rollable display 180 is completed, the controller 170 of the image display apparatus 100 may perform a control operation to display the home screen on which the application list 1010 and a broadcast image are displayed together. When an item is selected in the application list 1010 by the pointer 205 of the remote controller 200 while the height of the rollable display 180 is has as shown in FIG. 10B, the controller 170 of the image display apparatus 100 may control a screen image corresponding to the selected item to be displayed as shown in FIG. 10C.

Figure 10C:
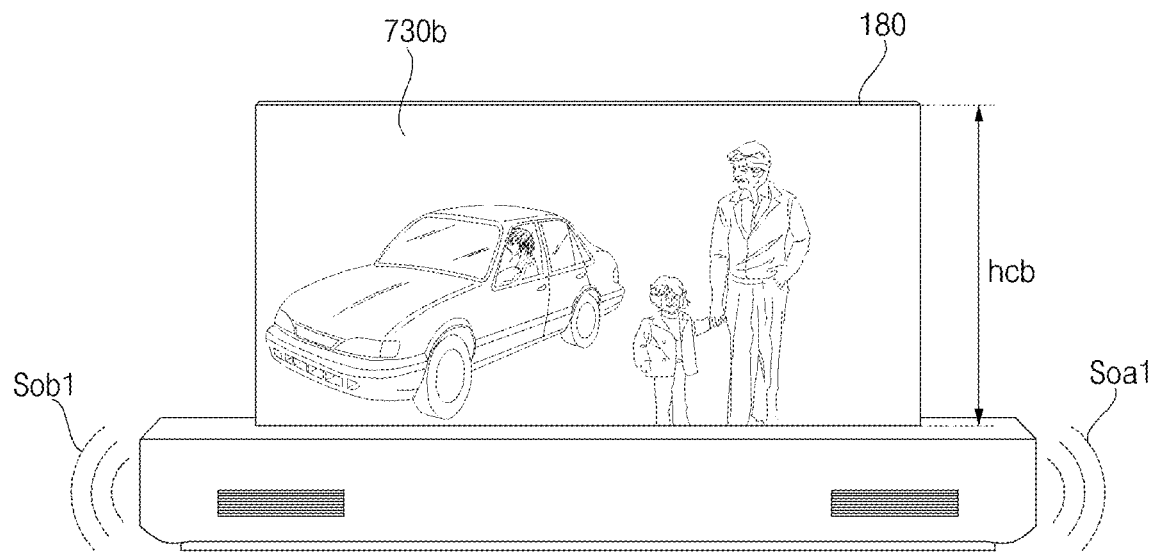

Particularly, as shown in FIG. 10C, the controller 170 of the image display apparatus 100 may perform a control operation during rolling-up of the rollable display 180 to display a broadcast image 730b and output sound Soa1, Sob1 of a first volume at the height hcb of the rollable display 180.

Figure 10D:
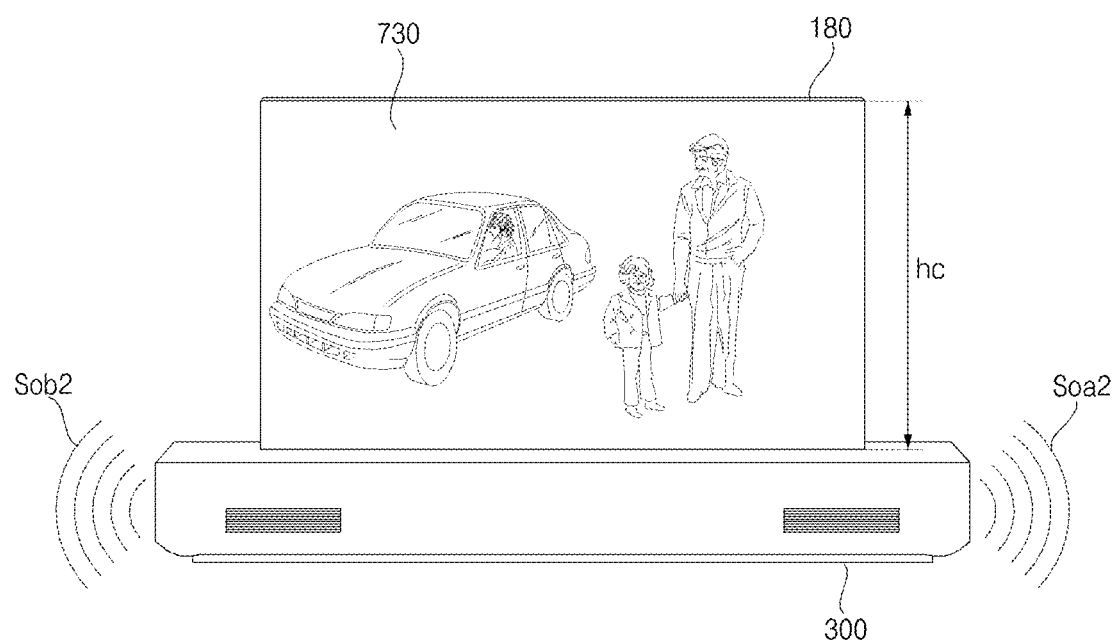

Next, as shown in FIG. 10D, when rolling up of the rollable display 180 is completed, the controller 170 of the image display apparatus 100 may perform a control operation to display a larger broadcast image 730 and output the sound Soa2, Sob2 of a second volume higher than the first volume at the height hc of the rollable display 180 greater than the height hcb.

Accordingly, the user may intuitively recognize that the displayed image is enlarged and the volume increases during rolling-up of the rollable display 180. On the other hand, when the height of the rollable display 180 is decreased from the height of FIG. 10D to the height of FIG. 10C, the controller 170 of the image display apparatus 100 may perform a control operation to decrease the size of the displayed image and the volume during rolling down of the rollable display 180. Accordingly, the user may intuitively recognize that the display is being rolled down.

If the height of the display 180 is less than a predetermined height when a broadcast image display input is provided during rolling down of the display 180, the broadcast image may be displayed, but may be excessively small. For this reason, the controller 170 of the image display apparatus 100 may control the application list to be displayed on the display 180 as shown in FIG. 10B.

If the height of the display 180 is greater than or equal to a predetermined height during rolling up of the display 180, the controller 170 of the image display apparatus 100 may perform a control operation to display a broadcast image 730b and output sound Soa1, Sob1 of the first volume at the height hcb of the display 180 as shown in FIG. 10C.

Next, as shown in FIG. 10D, when rolling up of the rollable display 180 is completed, the controller 170 of the image display apparatus 100 may perform a control operation to display a larger broadcast image 730 and output the sound Soa2, Sob2 of a second volume higher than the first volume at the height hc of the rollable display 180 greater than the height hcb. Meanwhile, as shown in FIGS. 10C and 10D, in order to display a first content image, the controller 170 of the image display apparatus 100 may control the volume of sound corresponding to the first content image to increase in proportion to the height of the display 180 during rolling up of the display 180.

Similarly, in order to display the first content image, the controller 170 of the image display apparatus 100 may control the volume of sound corresponding to the first content image to decrease in proportion to the height of the display 180 during rolling down of the display 180.

Similar to FIGS. 10C and 10D, in order to display the first content image, the controller 170 of the image display apparatus 100 may control the brightness of the first content image to increase in proportion to the height of the display 180 during rolling up of the display 180. Similarly, in order to display the first content image, the controller 170 of the image display apparatus 100 may control the brightness of the first content image to decrease in proportion to the height of the display 180 during rolling down of the display 180.

Upon receiving user information from the remote controller 200 or the mobile terminal 600, the controller 170 of the image display apparatus 100 may control recommended content or preferred content to be displayed according to the user information and may control the display 180 to be rolled up or down according to the recommended content or the preferred content. Details will be described with reference to FIGS. 11A to 12B.

Figure 11A:
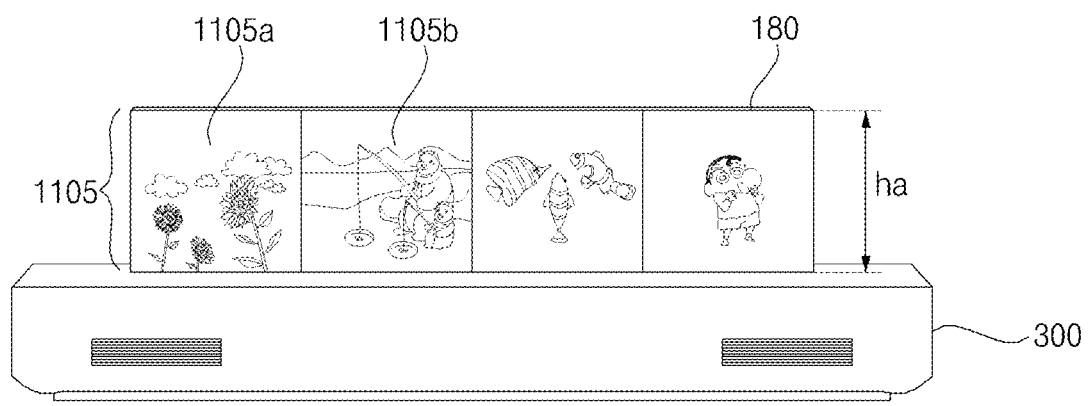
Figure 11A:
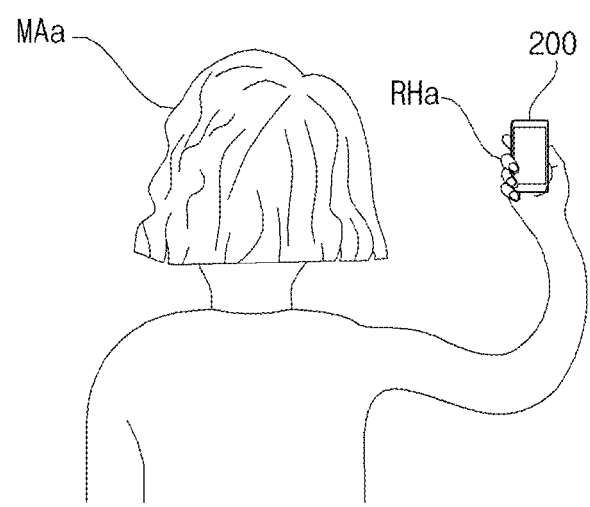

FIG. 11A illustrates that a thumbnail list 1105 having a plurality of thumbnails is displayed when the height of the rollable display 180 is ha. In this case, authentication of a first user MAa may be performed by a fingerprint sensor or the like included in the remote controller 200, and first user authentication information may be transmitted from the remote controller 200 to the user input interface unit 150 in the signal processing device 300.

The controller 170 of the image display apparatus 100 may control recommended content or preferred content for the first user to be displayed, based on the first user authentication information received through the user input interface unit 150. For example, the controller 170 may perform a control operation to display a broadcast image corresponding to a second thumbnail 1105b in the thumbnail list 1105. Meanwhile, the controller 170 of the image display apparatus 100 may control the display 180 to be rolled up or down according to the recommended content or the preferred content.

Figure 11B:
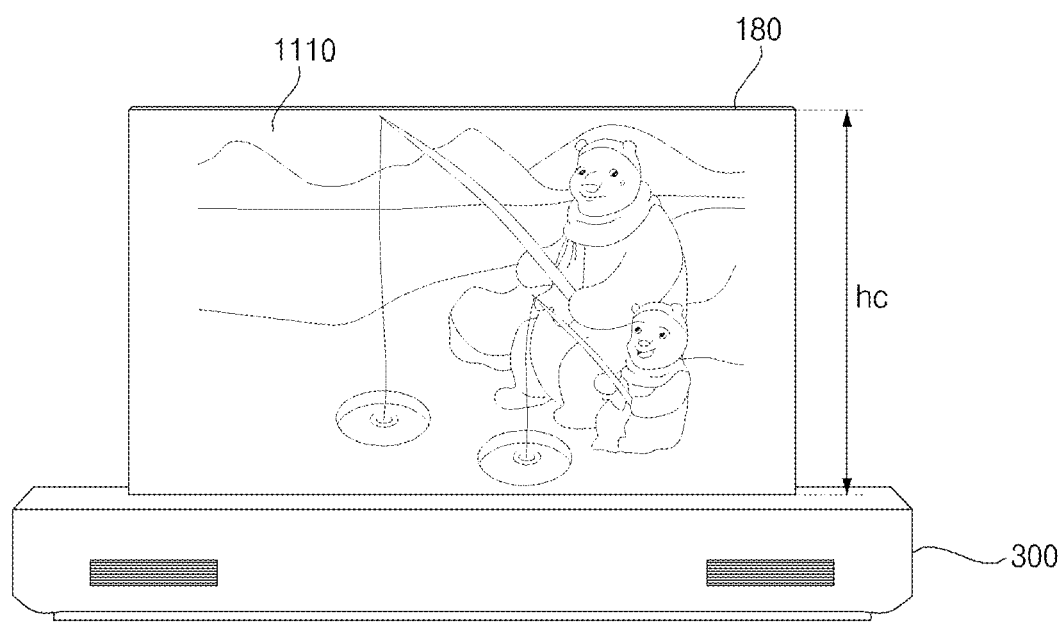
Figure 11B:
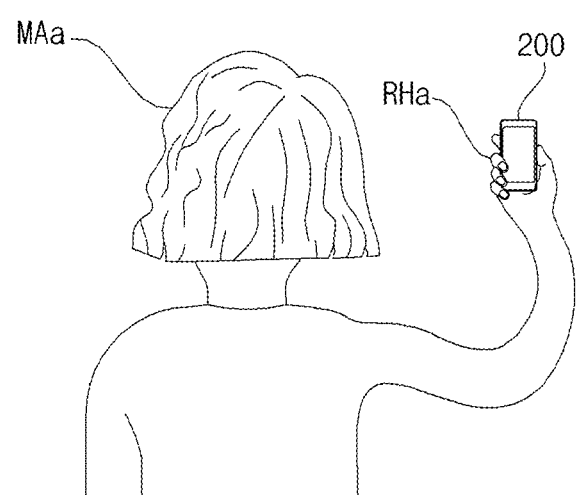

FIG. 11B illustrates that a broadcast image 1110 of a channel for the first user is displayed as the preferred content for the first user, and thus the display 180 is controlled to be rolled up to have a height hc. Thereby, content for the first user can be provided.

Figure 12A:
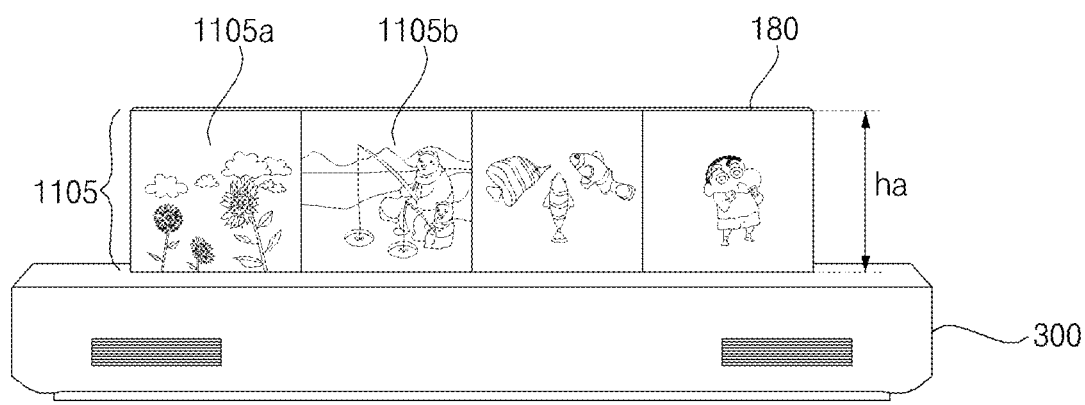
Figure 12A:
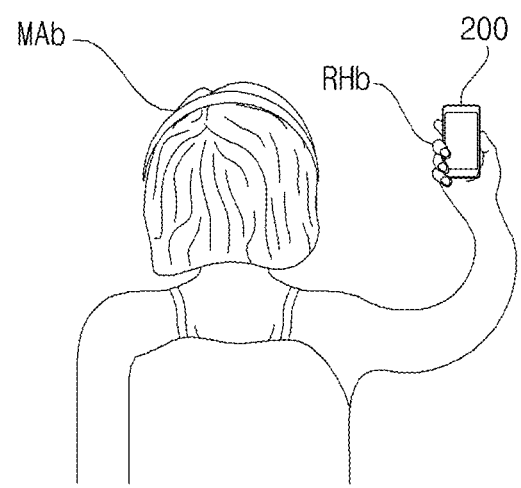

Next, FIG. 12A illustrates that a thumbnail list 1105 having a plurality of thumbnails is displayed when the height of the rollable display 180 is ha. In this case, authentication of a second user MAb may be performed by the fingerprint sensor or the like included in the remote controller 200, and the second user authentication information may be transmitted from the remote controller 200 to the user input interface unit 150 in the signal processing device 300.

The controller 170 of the image display apparatus 100 may control recommended content or preferred content for the second user to be displayed, based on the second user authentication information received through the user input interface unit 150. For example, the controller 170 may perform a control operation to display a broadcast image corresponding to a first thumbnail 1105a in the thumbnail list 1105. Meanwhile, the controller 170 of the image display apparatus 100 may control the display 180 to be rolled up or down according to the recommended content or the preferred content.

Figure 12B:
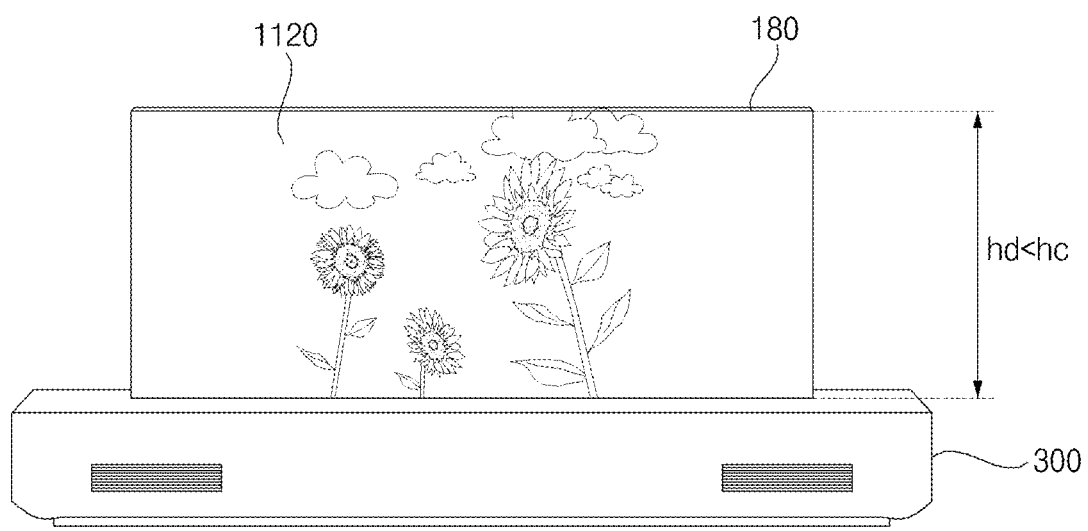

FIG. 12B illustrates that a movie image 1120 for the second user is displayed as the preferred content for the second user, and thus the display 180 is controlled to be rolled up to have a height hd less than hc. Accordingly, content for the second user can be provided.

Unlike the cases of FIGS. 11A to 12B, when the controller 170 of the image display apparatus 100 receives user authentication information from a mobile terminal through the network interface unit 135, it may control the recommended content or the preferred content to be displayed according to the user information, and control the display 180 to be rolled up or down according to the recommended content or the preferred content.

When the controller 170 of the image display apparatus 100 receives first user information from a first mobile terminal 600, it may control the first user information to be displayed and control the display 180 to have a second height. When the controller 170 further receives second user information from a second mobile terminal 600, it may control the second user information to be further displayed and control the display 180 to have a second height greater than the first height. Details will be described with reference to FIGS. 13A to 13E.

Figure 13A:
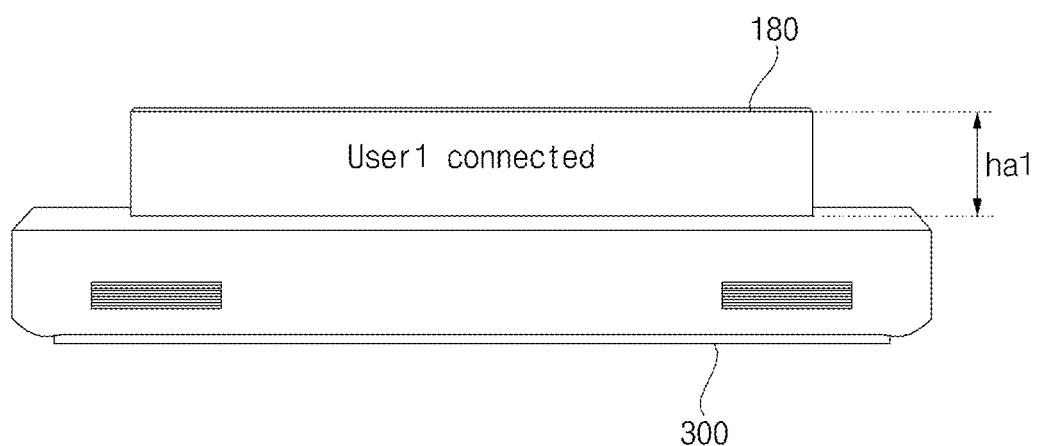
Figure 13A:
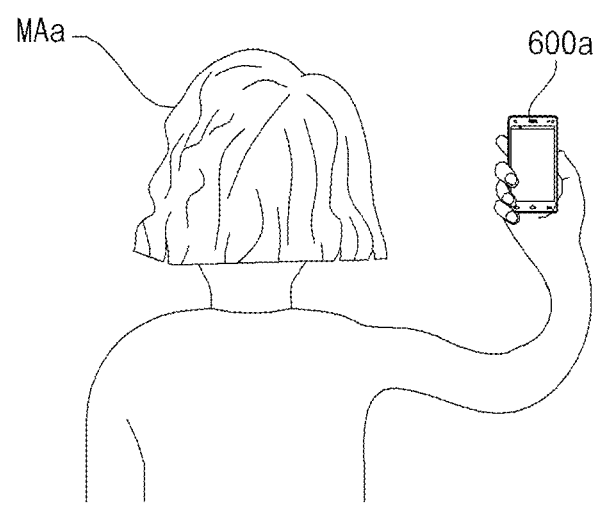

First, FIG. 13A illustrates that pairing with a first mobile terminal 600a is performed and an object indicating access of a first user is displayed. Authentication of the first user MAa may be performed by a fingerprint sensor or the like provided in the first mobile terminal 600a and first user authentication information may be transmitted from the first mobile terminal 600a to the signal processing device 300 through the network interface unit 135 in the signal processing device 300.

The controller 170 of the image display apparatus 100 may perform pairing with the first mobile terminal 600a based on the first user authentication information received through the network interface unit 135. Thus, the controller 170 of the image display apparatus 100 may control the height of the rollable display 180 to be ha1 in order to display the object indicating access of the first user.

Figure 13B:
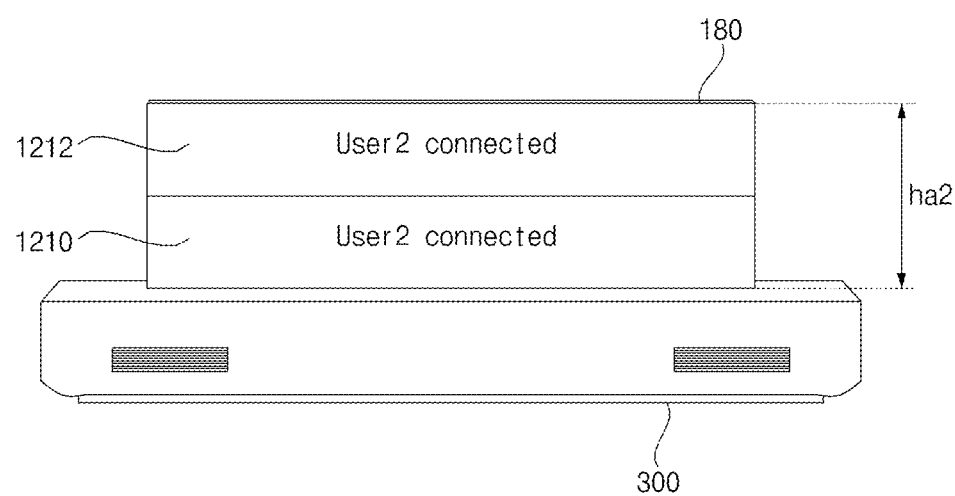
Figure 13B:
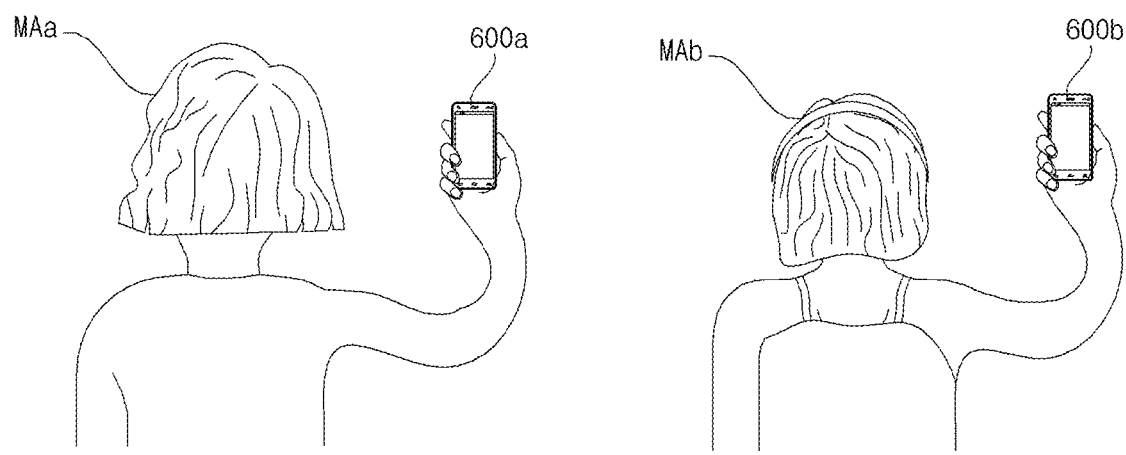

Next, FIG. 13B illustrates that additional pairing with a second mobile terminal 600b is performed and an object indicating access of a second user is additionally displayed, during pairing with the first mobile terminal 600a. Authentication for the second user MAb may be performed by a fingerprint sensor or the like provided in the second mobile terminal 600b and second user authentication information may be transmitted from the second mobile terminal 600b to the network interface unit 135 in the signal processing device 300.

The controller 170 of the image display apparatus 100 may further perform pairing with the second mobile terminal 600b based on the second user authentication information received through the network interface unit 135. That is, the controller 170 of the image display apparatus 100 may perform multi-pairing with the first and second mobile terminals.

Thus, the controller 170 of the image display apparatus 100 may control the height of the rollable display 180 to be ha2, which is greater than ha1, in order to display an object indicating simultaneous access of the first and second users.

In FIG. 13B, an object 1212 indicating access of the second user is displayed over an object 1210 indicating access of the first user. Accordingly, it is possible to recognize that pairing with a plurality of mobile terminals has been performed.

Figure 13C:
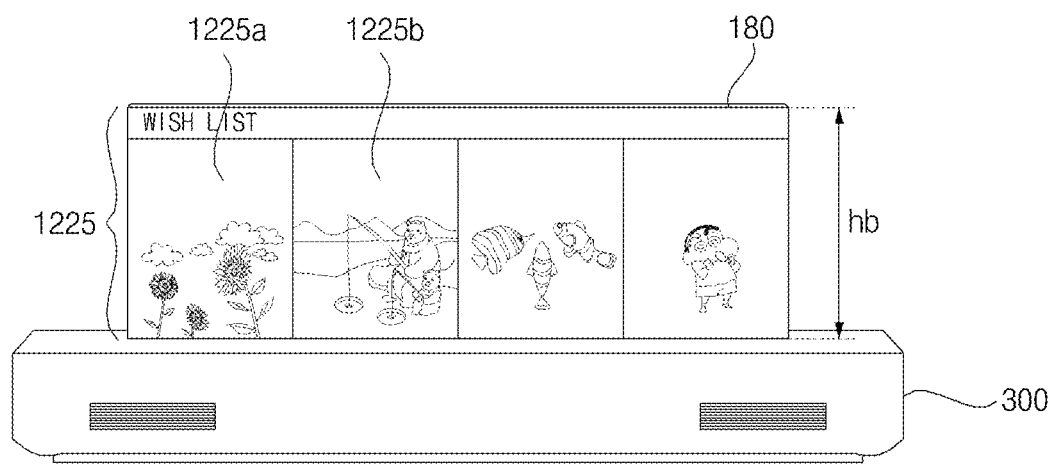
Figure 13C:
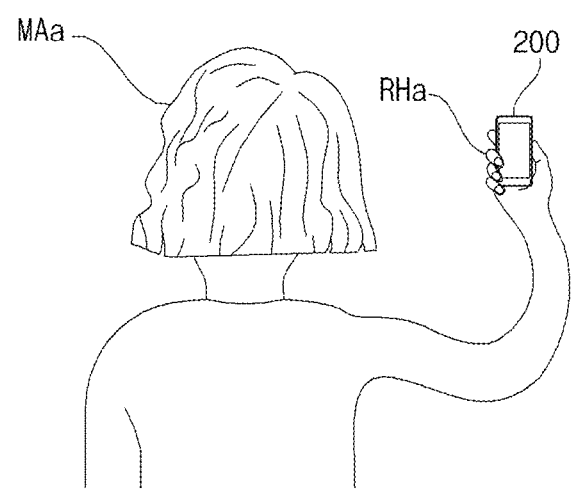

After pairing with the first mobile terminal 600a is performed and the object indicating access of the first user is displayed as shown in FIG. 13A, the controller 170 of the image display apparatus 100 may perform a control operation to display a thumbnail list 1225 related to the recommended content or preferred content for the first user, as shown in FIG. 13C.

The controller 170 of the image display apparatus 100 may control the height of the display 180 to be hb by rolling up the display 180 to display the thumbnail list 1225 of FIG. 13C. After displaying the thumbnail list 1225 of FIG. 13C, the controller 170 of the image display apparatus 100 may perform a control operation to display a home screen for the first user as shown in FIG. 13D.

Figure 13D:
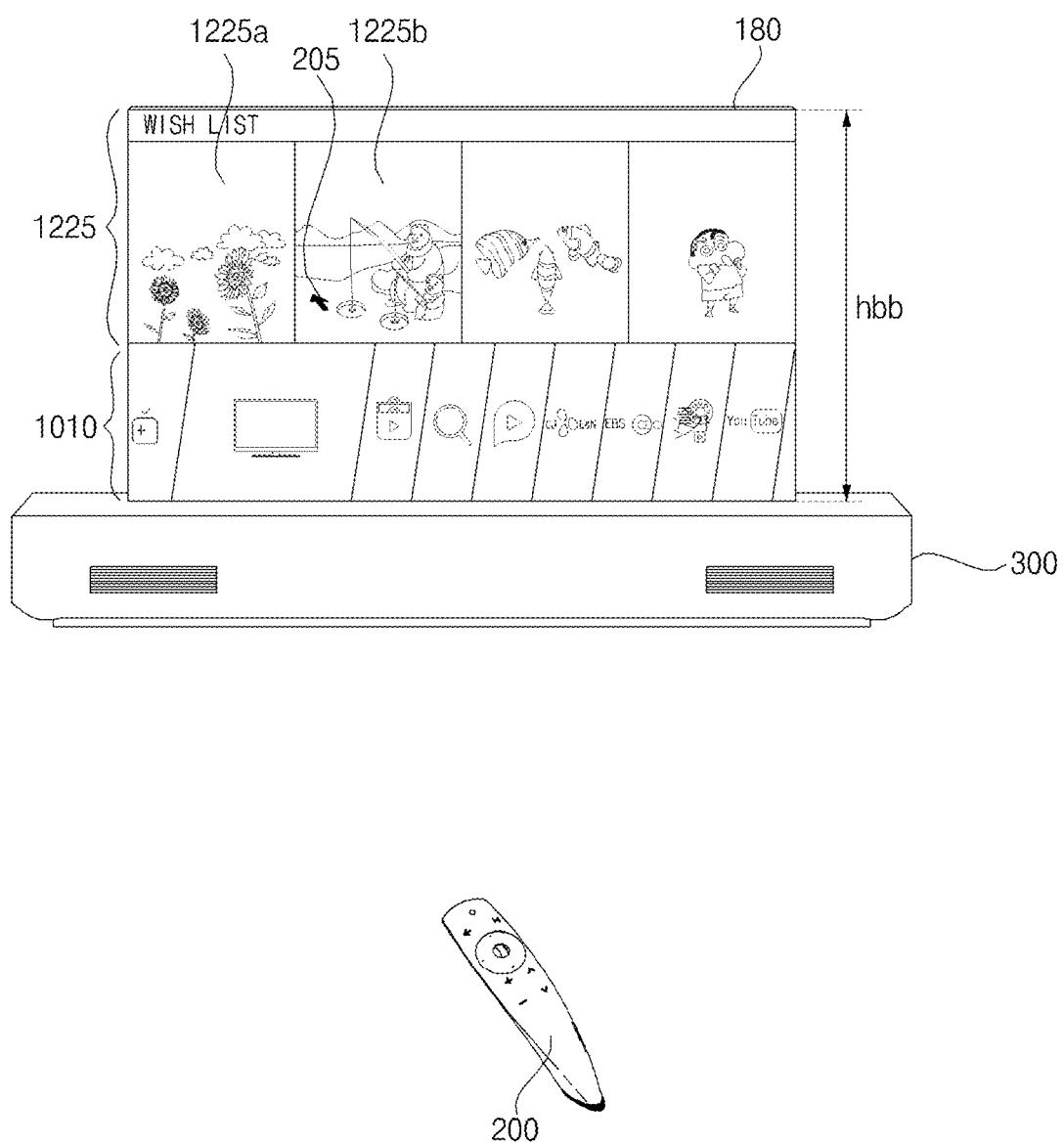

The home screen of FIG. 13D includes a thumbnail list 1225 related to recommended or preferred content and an application list 1010, but various modifications are possible. To display the home screen of FIG. 13D, the controller 170 of the image display apparatus 100 may control the height of the display 180 to be hbb, which is greater than hb, by rolling up the display 180. The first user may select any one of the thumbnail list 1225 and the application list 1010 through the mobile terminal 600a or the remote controller 200.

Figure 13E:
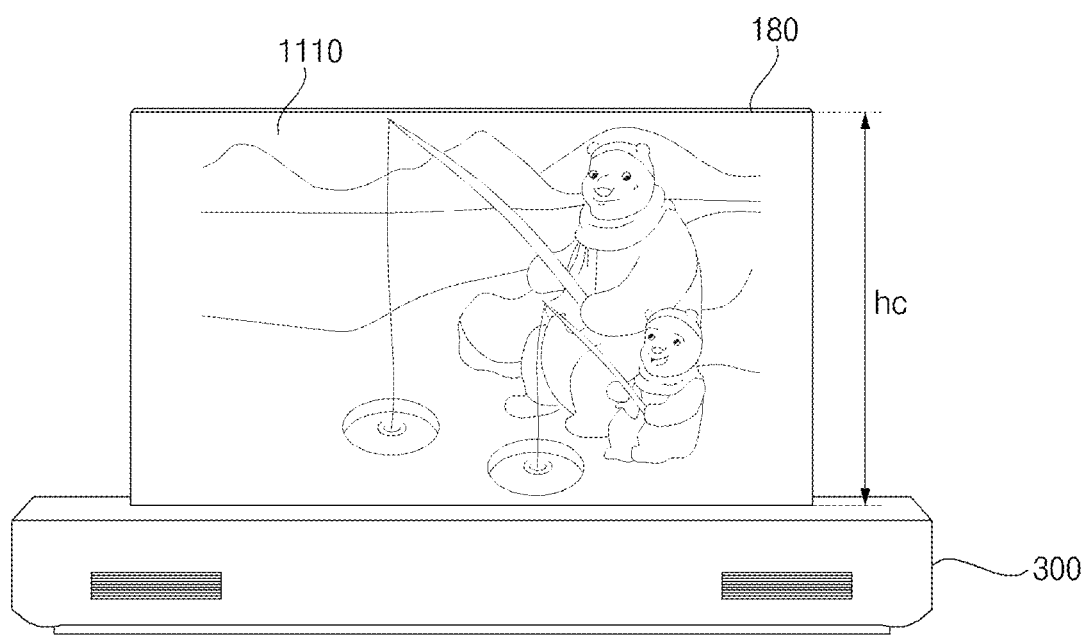

FIG. 13D illustrates that the first user selects a broadcast item 1225b in the thumbnail list 1225. Thus, the controller 170 of the image display apparatus 100 may perform a control operation to display a broadcast image 1110 corresponding to the broadcast item 1225b, as shown in FIG. 13E. In order to display the broadcast image 1110 in FIG. 13E, the controller 170 of the image display apparatus 100 may control the display 180 to be rolled up or down such that the height of the display 180 becomes hc. Accordingly, content for the first user can be provided.

Meanwhile, the controller 170 of the image display apparatus 100 may control the height of the display 180 to change according to the amount of content displayed on the mobile terminal 600 while being paired with the mobile terminal 600. Details will be described with reference to FIGS. 14A to 14C.

Figure 14A:
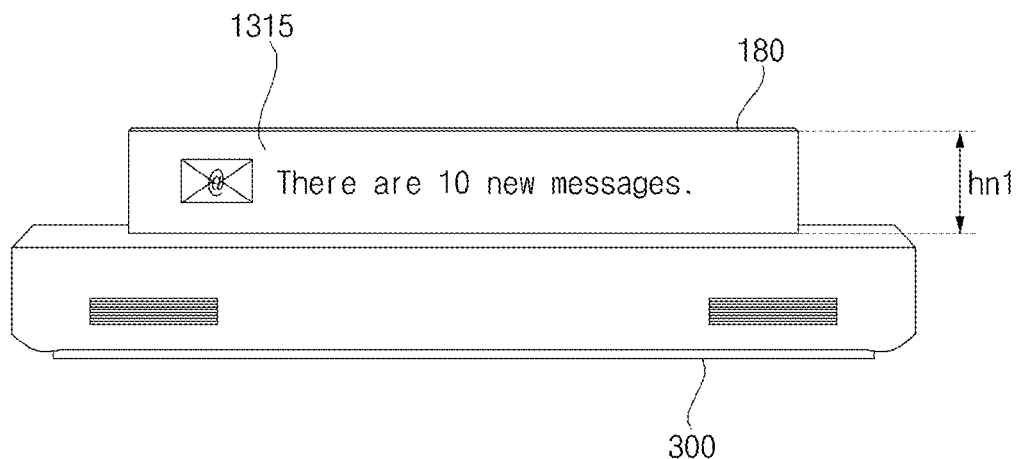
Figure 14A:
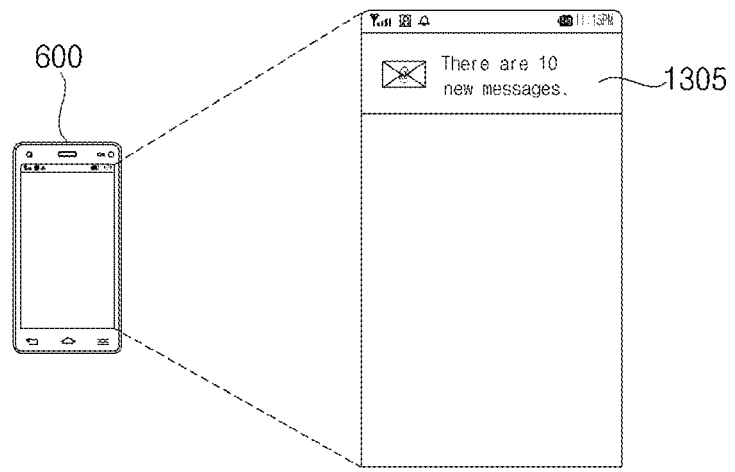

FIG. 14A illustrates that mirroring is performed between the image display apparatus 100 and the mobile terminal 600 after the image display apparatus 100 and the mobile terminal 600 are paired. As shown in FIG. 14A, when mail information 1305 is displayed on the screen of the mobile terminal 600 at a first time, the controller 170 of the image display apparatus 100 may control the mail information 1315 to be displayed in response. In this case, the controller 170 of the image display apparatus 100 may control the height of the rollable display 180 to be hn1 in order to display the mail information 1315.

Figure 14B:
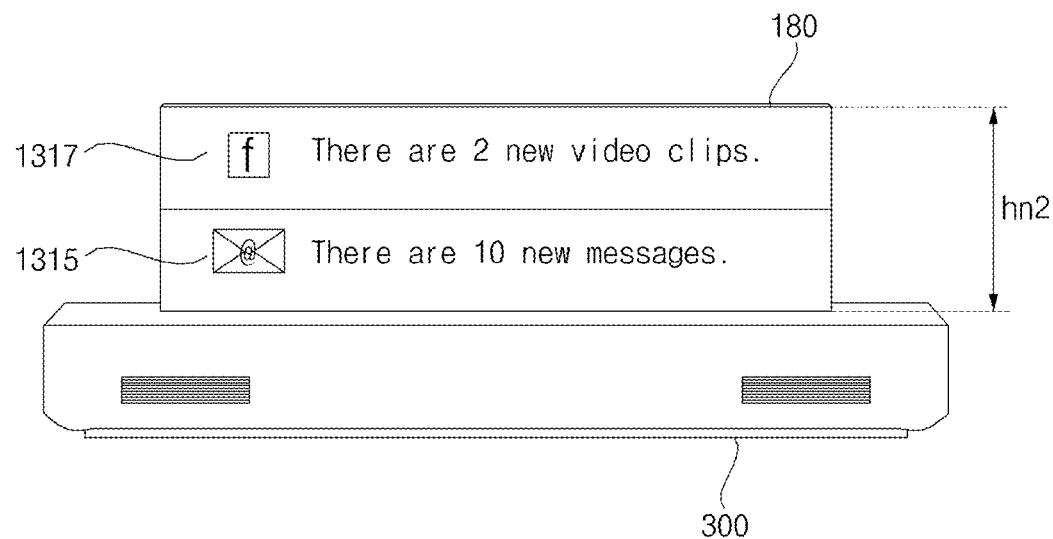
Figure 14B:
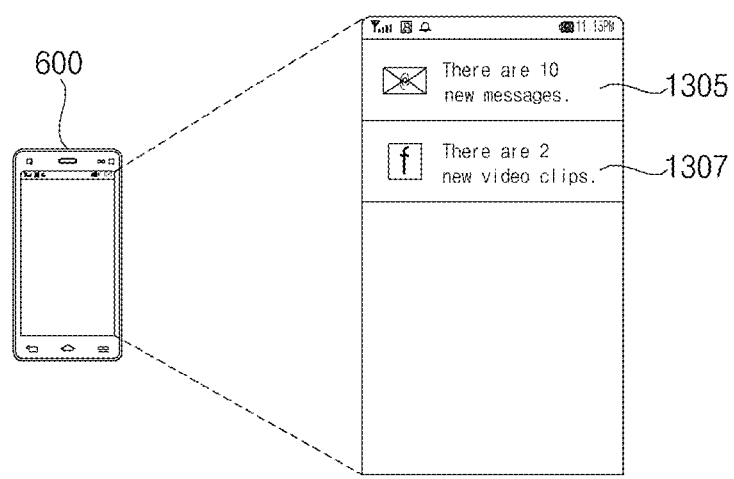

Next, as shown in FIG. 14B, when moving image information 1307 is additionally displayed on the screen of the mobile terminal 600 in addition to the mail information 1305 at a second time, the controller 170 of the image display apparatus 100 may control the mail information 1315 and moving image information 1317 to be displayed in response. In this case, the controller 170 of the image display apparatus 100 may control the height of the rollable display 180 to be hn2, which is greater than hn1, in order to display the mail information 1315 and the moving image information 1317.

Figure 14C:
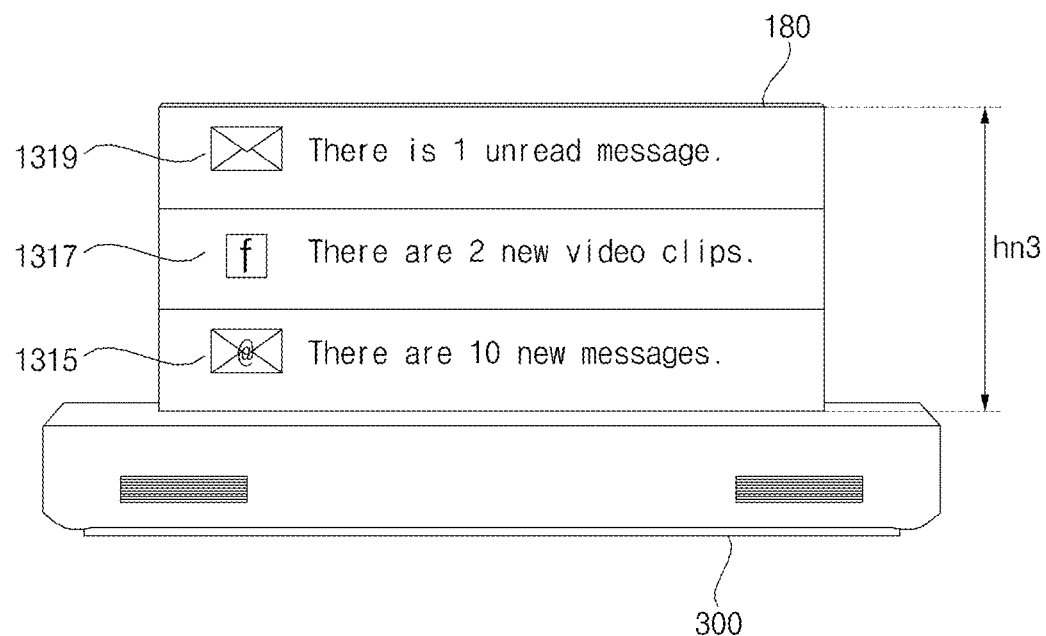
Figure 14C:
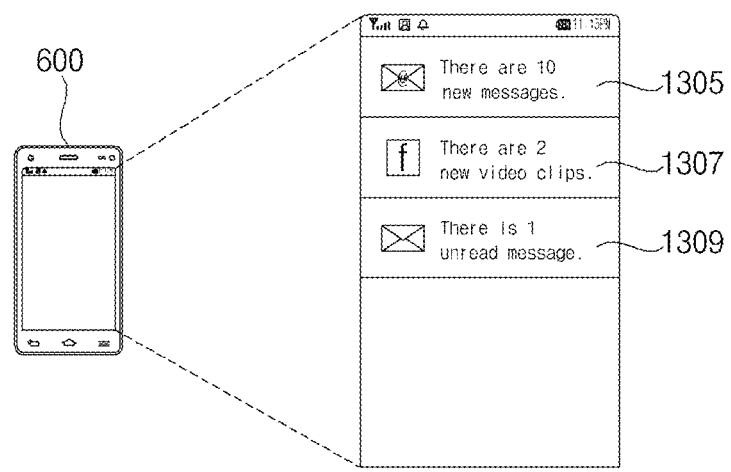

Next, as shown in FIG. 14C, when message information 1309 is displayed in addition to the mail information 1305 and the moving image information 1307 on the screen of the mobile terminal 600 at a third time, the controller 170 of the image display apparatus 100 may control the mail information 1315, the moving image information 1317 and the message information 1319 to be displayed.

In this case, the controller 170 of the image display apparatus 100 may control the height of the rollable display 180 to be hn3, which is greater than hn2, in order to display the mail information 1315, the moving image information 1317, and the message information 1319. Meanwhile, the controller 170 of the image display apparatus 100 may calculate a distance according to the strength of a signal from the remote controller 200 or the mobile terminal 600, and control the height of the display 180 to be changed according to the calculated distance. Details will be described with reference to FIGS. 15A to 15D.

Figure 15A:
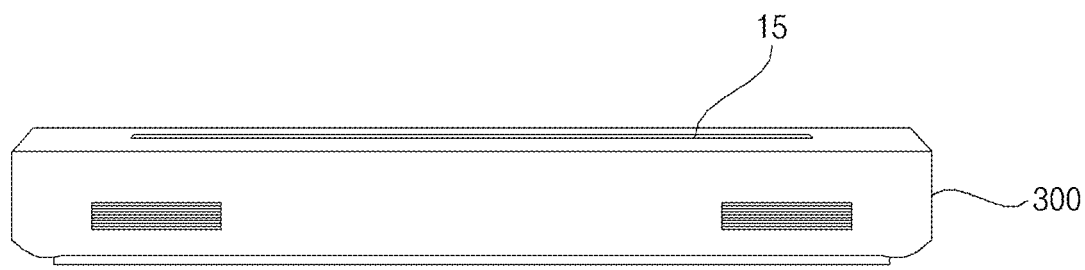

FIG. 15A illustrates the signal processing device 300 of the image display apparatus 100 set in the standby mode after being powered on. Thus, the rollable display 180 is wound around the roller in the signal processing device 300 and is not exposed to the outside of the opening 150.

Upon receiving a signal from the remote controller 200, the controller 170 of the image display apparatus 100 may control the display 180 wound in the signal processing device 300 to be rolled up. In this case, the controller 170 of the image display apparatus 100 may calculate a distance according to the strength of the signal from the remote controller 200, and control the height of the display 180 to be changed according to the calculated distance.

Figure 15B:
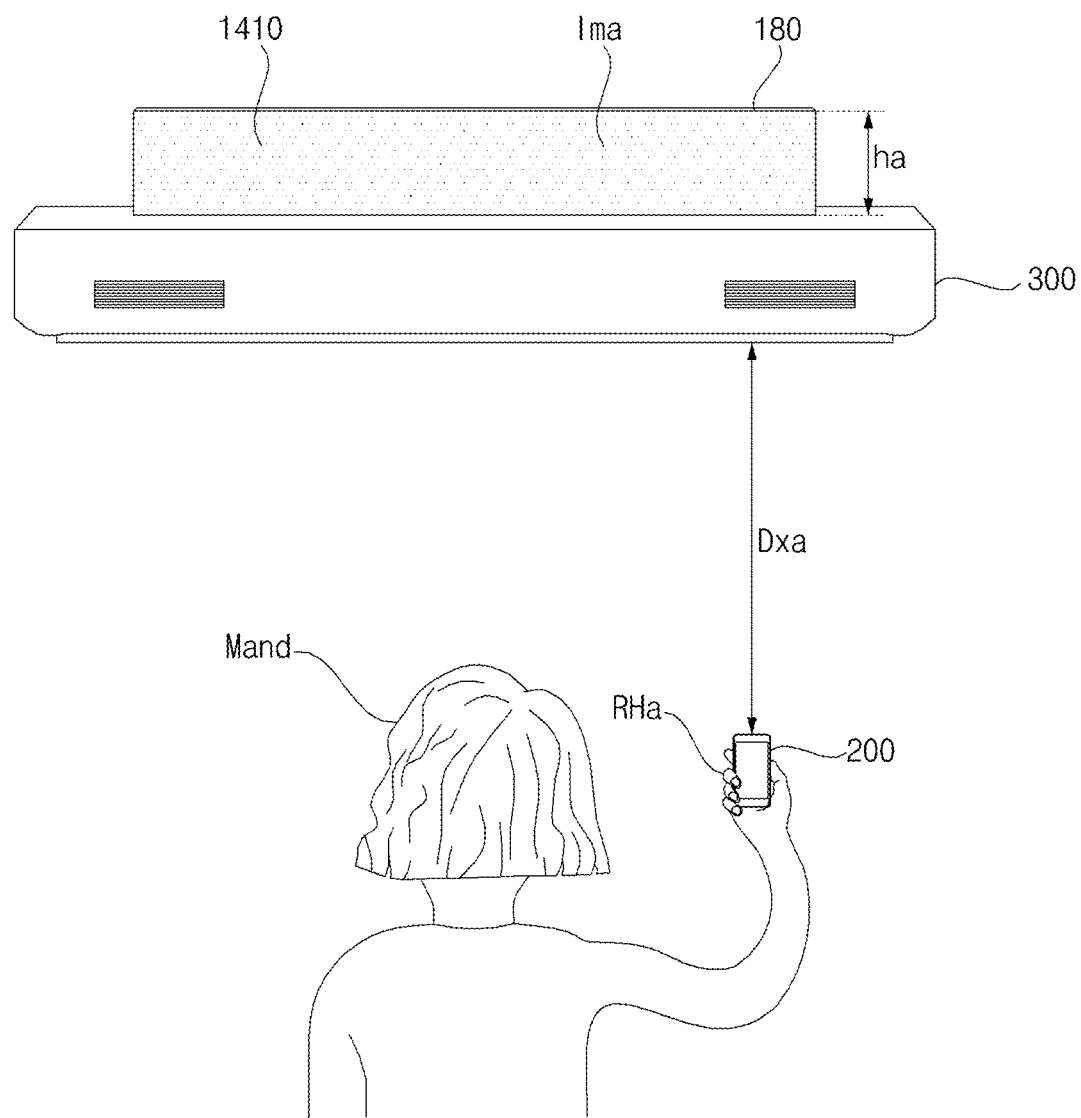

FIG. 15B illustrates that the distance between the remote controller 200 and the signal processing device 300 is Dxa. Accordingly, the controller 170 of the image display apparatus 100 may control the height of the rollable display 180 to be ha according to the distance Dxa.

Figure 15C:
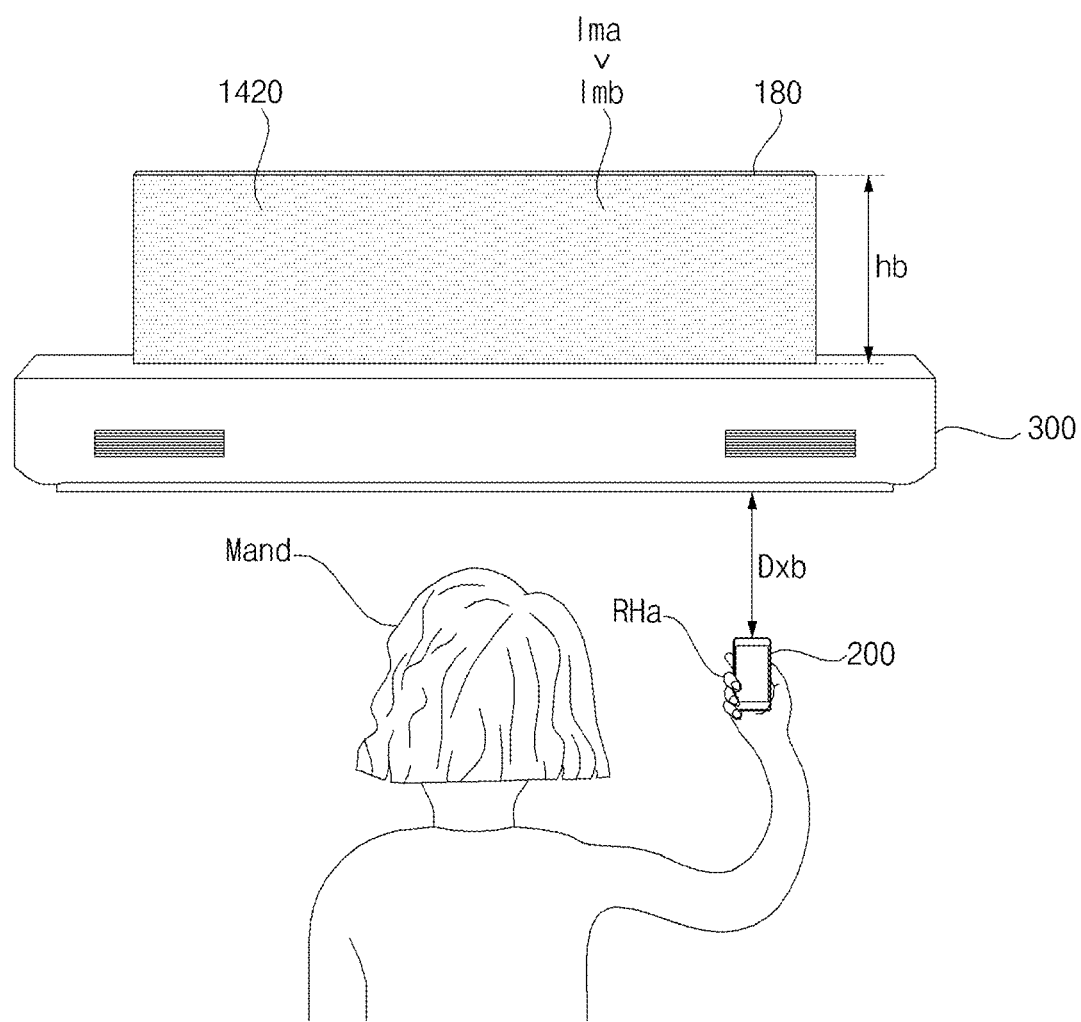

Next, FIG. 15C illustrates that the distance between the remote controller 200 and the signal processing device 300 is Dxb, which is less than Dxa. Accordingly, the controller 170 of the image display apparatus 100 may control the height of the rollable display 180 to be hb, which is greater than ha, according to the distance Dxb. That is, the controller 170 of the image display apparatus 100 may control the height of the rollable display 180 to be changed in inverse proportion to the distance between the remote controller 200 and the signal processor 300.

Alternatively, the controller 170 of the image display apparatus 100 may control the height of the rollable display 180 to be changed in proportion to the distance between the remote controller 200 and the signal processor 300. That is, in FIG. 15C, the height of the rollable display 180 may be less than that of FIG. 15B.

The brightness of the rollable display 180 of FIG. 15C may be lower than in the case of FIG. 15B. Thus, the brightness may be lowed for a user at a closer distance and the eyesight of the user may be protected. Conversely, the brightness of the rollable display 180 of FIG. 15C may be greater than that of FIG. 15B.

Figure 15D:
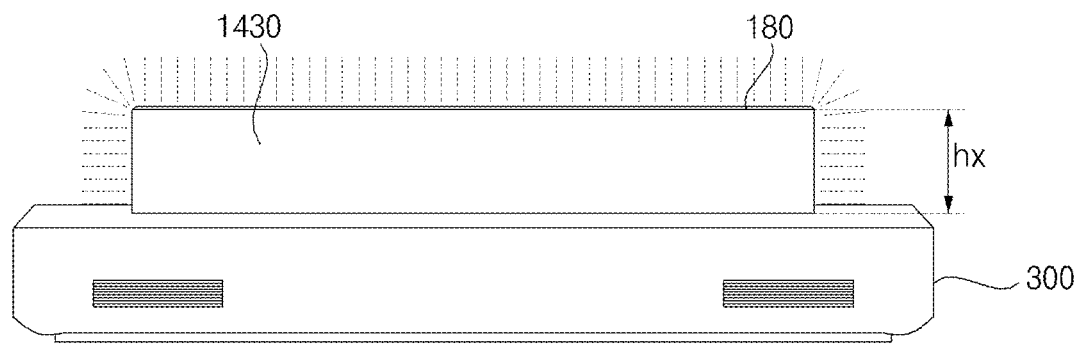

According to the lighting mode or when there is no signal input from the remote controller 200 for a predetermined time, the controller 170 of the image display apparatus 100 may perform a control operation to operate in the lighting mode as shown in FIG. 15D. For example, the controller 170 of the image display apparatus 100 may control the rollable display 180 to display light of the yellowish color, and control the height of the rollable display 180 to be hx. Accordingly, the rollable display 180 may be utilized as a lighting device.

Meanwhile, in the lighting mode, the controller 170 of the image display apparatus 100 may change the color of the light output from the rollable display 180. Further, in the lighting mode, the color of the light may be changed according to the music that is played back. Mood lighting can be implemented. The controller 170 of the image display apparatus 100 may control a pointer to be displayed on the display 180 at a first height of the display 180, and control the height of the display 180 to be a second height greater than the first height according to movement of a pointing signal of the display 180. Details will be described with reference to FIGS. 16A to 16D.

Figure 16A:
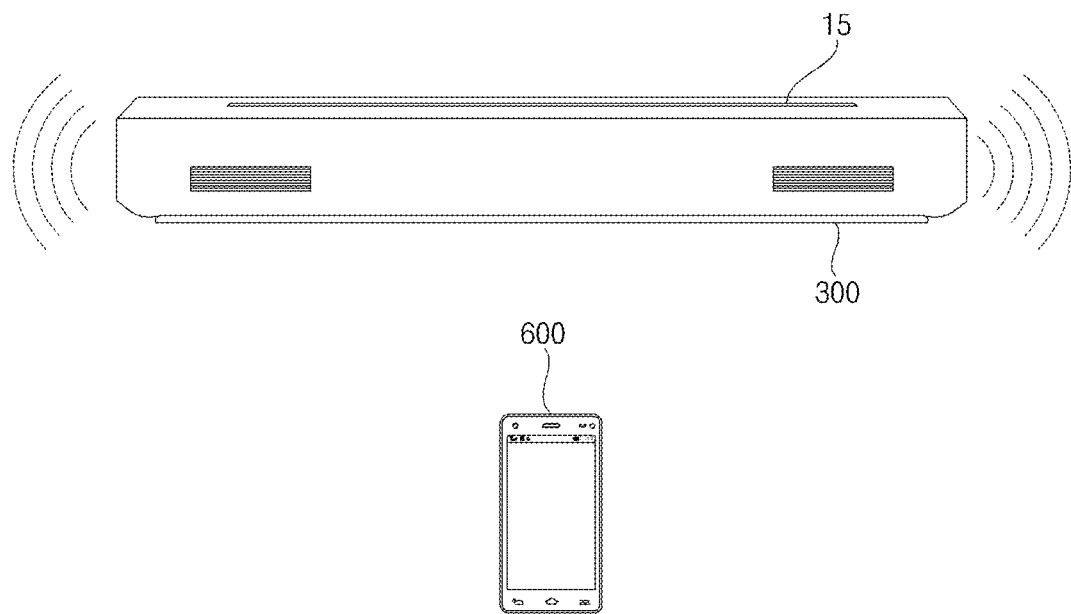

FIG. 16A illustrates output of sound according to music playback while the rollable display 180 is wound around a roller in the signal processing device 300 and is not exposed to the outside of the opening 150. For example, when music playback input is provided from the paired mobile terminal 600, the controller 170 of the image display apparatus 100 may control the sound of music played back in the mobile terminal 600 to be output through a speaker unit 185a in the processing apparatus 300.

Figure 16B:
Figure 16B:
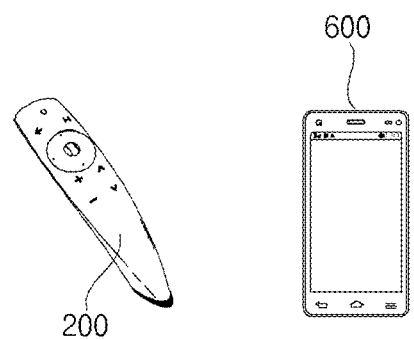

Upon receiving a signal from the remote controller 200, the controller 170 of the image display apparatus 100 may control the display 180 wound in the signal processing device 300 to be rolled up. FIG. 16B illustrates that the height of the display 180 is ha. In this case, the controller 170 of the image display apparatus 100 may receive a pointing signal from the remote controller 200.

Figure 16C:
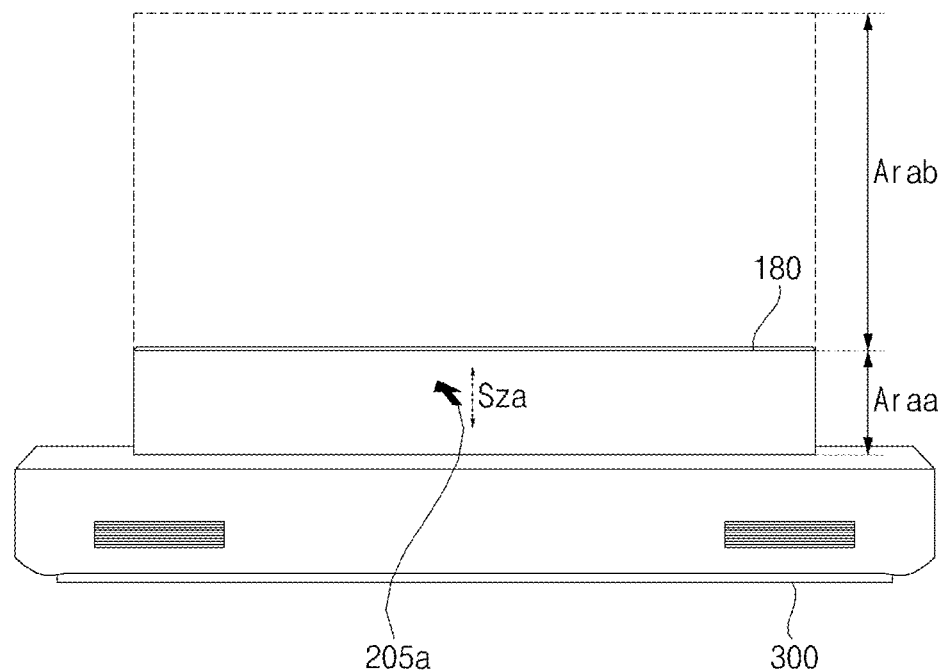
Figure 16C:
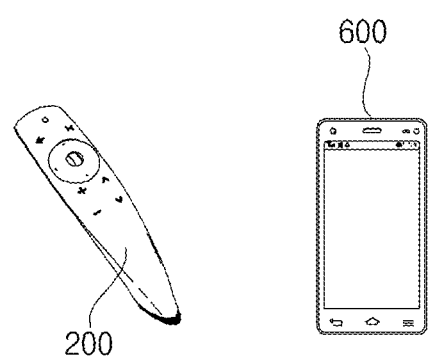
Figure 16D:
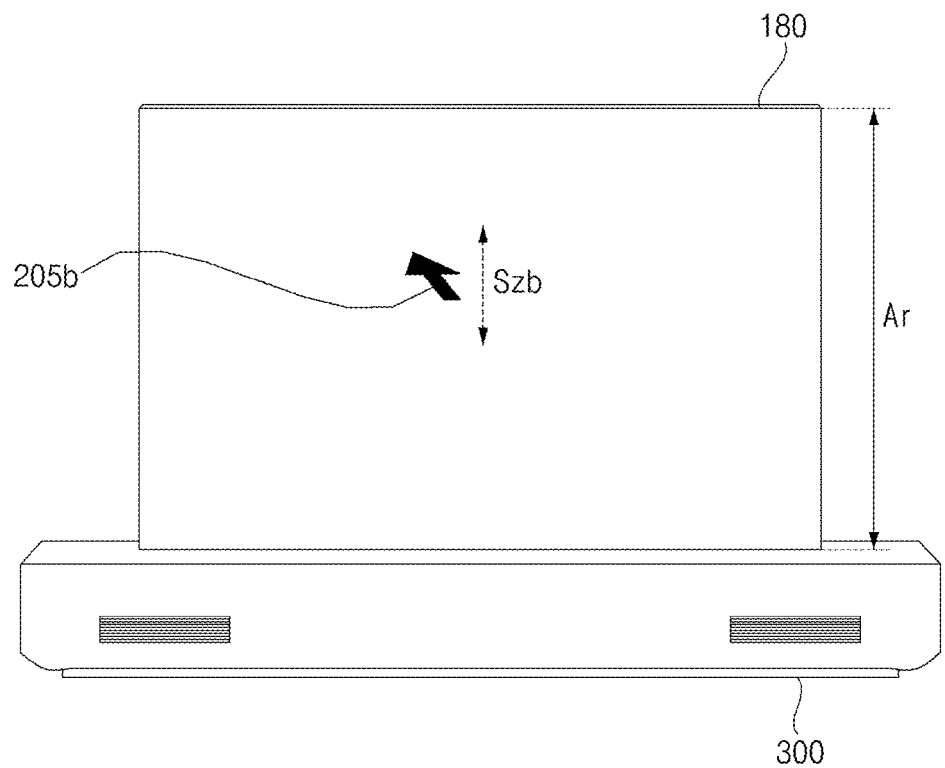
Figure 16D:
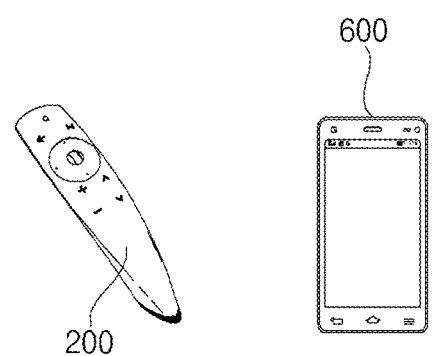

Then, the controller 170 of the image display apparatus 100 may control the pointer 205a to be displayed based on the pointing signal, as shown in FIG. 16C. In this case, the height of the display 180 may be Araa. When the controller 170 of the image display apparatus 100 receives a pointing signal corresponding to upward movement, it may control the display 180 to be rolled up to have a height of Ar to display the pointer, as shown in FIG. 16D. Meanwhile, the controller 170 of the image display apparatus 100 may control the size of the pointer or a unit movement distance of the pointer to be changed with the size of the display 180.

Referring to FIGS. 16C and 16D, since the height of the display 180 in FIG. 16D is Ar and is greater than the height of FIG. 16C, the controller 170 of the image display apparatus 100 may control the size of the pointer 205b to be larger than the size of the pointer 205a of FIG. 16C, and control the unit movement distance of the pointer, which is Szb, to be longer than Sza in FIG. 16C. Accordingly, the pointer may be moved or displayed according to the size of the display, and thus user convenience may be enhanced.

The display apparatus according to embodiments of the present invention is not limited to configurations and methods of the embodiments described above. Variations may be made to the embodiments described above by selectively combining all or some of the embodiments.

As is apparent from the above description, according to an embodiment of the present invention, there is provided an image display apparatus including a rollable display, a drive unit to change a size of the display, and a controller to control the display, wherein, when a content display command is input, the controller determines the size of the display according to an attribute of content to be displayed, and controls the drive unit to roll the display up or down according to the determined size. Accordingly, the size of the display may be changed according to the attribute of the content.

In addition, unnecessary power may be reduced by changing the size of the display according to the attribute of the content. As a result, power consumption may be reduced. In particular, if the content to be displayed is audio content, the size of the display may be controlled to be reduced as compared to a case when the content to be displayed is video content. Thereby, unnecessary power may be reduced. As a result, power consumption may be reduced.

When the content to be displayed is a 21:9 movie image, the height of the display may be controlled to be reduced compared to the height given when the content to be displayed is a 16:9 broadcast image. Accordingly, as the size of the display is adjusted to a size proper for the size of the original content, immersiveness in viewing the content may be further enhanced.

By causing the height of the display to be changed according to the amount of data of the content to be displayed, unnecessary power can be reduced, and consequently, power consumption can be reduced. When the content to be displayed is a game screen for two players, the height of the display may be controlled to be greater than when the content to be displayed is a game screen for a single player. Thereby, user convenience may be enhanced in displaying a game screen.

Meanwhile, in order to display a first content image while the display is rolling up, the volume of sound corresponding to the first content image may be controlled to increase in proportion to the height of the display. Accordingly, the user may recognize the height of the display through the sound. During pairing with a mobile terminal, the height of the display may be controlled to change according to the amount of content displayed on the mobile terminal. Thereby, user convenience may be enhanced, and power consumption may be reduced.

By changing the height of the display according to movement of a pointing signal from a remote controller, user convenience may be enhanced, and power consumption may be reduced.

According to another embodiment of the present invention, there is provided an image display apparatus including a rollable display, a drive unit to change a height of the display, and a controller to control the display, wherein, when a content display command is input, the controller determines the height of the display according to an attribute of content to be displayed and controls the drive unit to roll up or roll down the display according to the determined height. Accordingly, the size of the display may be changed according to the attribute of the content.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:
1. An image display apparatus comprising:
a rollable display;
a drive unit configured to roll up or roll down the rollable display; and
a controller configured to:
in response to a first display command to display a first type of content, control the drive unit to roll up the rollable display to a first size based on the first type of the content, and
in response to a second display command to display a second type of content, control the drive unit to roll up the rollable display to a second size based on the second type of the content,
wherein the controller is configured to:
control the rollable display to be rolled up or down to have a first height for displaying a first object indicating a voice recognition mode,
while the rollable display has the first height, display a second object indicating which voice recognition is being performed based on a voice input,
when the voice input includes a search command, perform a search based on the voice input, and control the rollable display to be rolled up to have a second height higher than the first height for displaying a search result,
while the rollable display has the second height, display a search result image including the search result, and
wherein the search result image includes a first search result data and a second search result data which is partially displayed below the first search result data.

2. The image display apparatus according to claim 1, wherein when the first type of content corresponds to audio content, the first size of the rollable display is reduced compared to the second size based on the second type of content corresponding to video content.

3. The image display apparatus according to claim 1, wherein when the first type of content corresponds to a movie image, the controller controls a height of the rollable display to be reduced compared to a height of the rollable display based on the second type of content corresponding to a broadcast image.

4. The image display apparatus according to claim 1, wherein the controller changes a height of the rollable display according to an amount of data of the first or second type of the content to be displayed.

5. The image display apparatus according to claim 1, further comprising:
an external device interface unit configured to receive data from an external device,
wherein when the first type of the content is a document creation image executed on a personal computer (PC) corresponding to the external device, the first size of the rollable display has an increased height compared to a height of the second size of the rollable display when the second type of the content is a background image of the PC.

6. The image display apparatus according to claim 1, further comprising:
an external device interface unit configured to receive data from an external device,
wherein when the first type of content is a two-player game image from the external device, the first size of the rollable display has an increased height compared a height of the second size of the rollable display when the second type of the content is a single-player game image.

7. The image display apparatus according to claim 1, wherein the controller displays the second type of the content different from the first type of the content while changing the size of the rollable display to display the first type of content.

8. The image display apparatus according to claim 1, wherein when the first display command is a broadcast image display command, the controller displays an application list on the rollable display while controlling the drive unit to roll up the rollable display to the first size to display a broadcast image.

9. The image display apparatus according to claim 1, further comprising:
a user input interface unit configured to receive a remote controller signal from a remote controller,
wherein the controller displays an application list on the rollable display when a size of the rollable display is a third height, and
wherein when an item is selected in the application list by a pointer displayed according to movement of the remote controller, the controller controls the drive unit to roll up the rollable display to have a fourth height greater than the third height in order to display an image of a selected application.

10. The image display apparatus according to claim 1, further comprising:
an audio output unit,
wherein the controller increases a volume of sound output via the audio output unit corresponding to the first type of content in proportion to an increase in a height of the rollable display.

11. The image display apparatus according to claim 1, wherein the controller increases a brightness of the first type of content in proportion to an increase in a height of the rollable display.

12. The image display apparatus according to claim 1, further comprising:
an audio output unit,
wherein, in order to display a broadcast image, the controller outputs a first sound via the audio output unit corresponding to the broadcast image while controlling the drive unit to roll up the rollable display and outputs a second sound via the audio output unit corresponding to a broadcast image to be displayed when rolling up of the display is completed, and
wherein a volume of the second sound is higher than a volume of the first sound.

13. The image display apparatus according to claim 1, further comprising:
a user input interface unit configured to receive a remote controller signal from the remote controller; and
a network interface unit to exchange data with a mobile terminal,
wherein when user information is received from the remote controller or the mobile terminal, the controller displays recommended content or preferred content on the rollable display according to the user information and controls the drive unit to roll up or down the rollable display according to the recommended content or the preferred content.

14. The image display apparatus according to claim 1, further comprising:
a network interface unit configured to exchange data with mobile terminals,
wherein when first user information is received from a first mobile terminal, the controller displays the first user information on the rollable display having a third height, and
wherein when second user information is received from a second mobile terminal, the controller displays the second user information on the rollable display having a fourth height greater than the third height.

15. The image display apparatus according to claim 1, further comprising:
a network interface unit configured to exchange data with a mobile terminal,
wherein the controller changes a height of the rollable display according to an amount of content displayed on the mobile terminal while being paired with the mobile terminal.

16. The image display apparatus according to claim 1, further comprising:
a user input interface unit configured to receive a remote controller signal from the remote controller; and
a network interface unit configured to exchange data with a mobile terminal,
wherein the controller calculates a distance according to a strength of a signal from the remote controller or the mobile terminal, and changes a height of the rollable display according to the calculated distance.

17. The image display apparatus according to claim 1, further comprising:
a user input interface unit configured to receive a remote controller signal from the remote controller,
wherein, when a signal is received from the remote controller, the controller controls the drive unit to roll up the rollable display.

18. The image display apparatus according to claim 1, further comprising:
a user input interface unit configured to receive a remote controller signal from the remote controller,
wherein the controller displays a pointer on the rollable display when a height of the rollable display is a third height, and controls the drive unit to change the height of the rollable display to a fourth height greater than the third height according to movement of a pointing signal from the remote controller.

19. The image display apparatus according to claim 1, wherein the drive unit is included in a casing and comprises:
a roller on which the rollable display is wound; and
a motor to rotate the roller, and
wherein the controller controls the drive unit to roll the rollable display on the roller such that the rollable display is not exposed outside of the casing in a standby mode.

20. The image display apparatus according to claim 1, wherein the first size of the rollable display comprises a first height and the second size of the rollable display corresponds to a second height.

* * * * *